United States Patent
Johnson et al.

(10) Patent No.: US 9,164,588 B1
(45) Date of Patent: Oct. 20, 2015

(54) WEARABLE COMPUTING DEVICE WITH GESTURE RECOGNITION

(71) Applicant: Google Inc., Mountain View, CA (US)

(72) Inventors: Michael Patrick Johnson, Mountain View, CA (US); Mat Balez, San Francisco, CA (US); David Sparks, Cupertino, CA (US); Thad Eugene Starner, Atlanta, GA (US)

(73) Assignee: Google Inc., Mountain View, CA (US)

( * ) Notice: Subject to any disclaimer, the term of this patent is extended or adjusted under 35 U.S.C. 154(b) by 243 days.

(21) Appl. No.: 13/760,048

(22) Filed: Feb. 5, 2013

(51) Int. Cl.
*G06F 3/01* (2006.01)

(52) U.S. Cl.
CPC ............................... *G06F 3/017* (2013.01)

(58) Field of Classification Search
None
See application file for complete search history.

(56) References Cited

U.S. PATENT DOCUMENTS

| | | | |
|---|---|---|---|
| 6,369,952 B1 | 4/2002 | Rallison et al. | |
| 2006/0256140 A1* | 11/2006 | Turner | 345/690 |
| 2009/0319181 A1 | 12/2009 | Khosravy et al. | |
| 2010/0259471 A1* | 10/2010 | Takano et al. | 345/156 |
| 2012/0262558 A1 | 10/2012 | Boger et al. | |
| 2013/0237146 A1* | 9/2013 | Serota | 455/12.1 |

FOREIGN PATENT DOCUMENTS

WO 03/001340 1/2003

OTHER PUBLICATIONS

Y. W. Chow, "3D Spatial Interaction with the Wii Report for Head-Mounted Display Virtual Reality", World Academy of Science, Engineering and Technology, Feb. 2009, pp. 377-383, Issue 26.
S. Y. Hwang et al., "Fall Detection with Three-Axis Accelerometer and Magnetometer in a Smartphone", Proceedings of the International Conference of Computer Science and Technology, Jun. 2012, pp. 65-70, ASTL 06, Science and Engineering Research Support Society, Jeju, Korea.
Invensense Inc.,"MPU-6100 and MPU-6150 Product Specification", Feb. 2, 2012, Document No. PS-MPU-6100A-00, Revision 1.1, InvenSense Inc., Sunnyvale, CA.

* cited by examiner

*Primary Examiner* — Grant Sitta
*Assistant Examiner* — Kirk Hermann
(74) *Attorney, Agent, or Firm* — McDonnell Boehnen Hulbert & Berghoff LLP

(57) ABSTRACT

Methods, apparatus, and computer-readable media are described herein related to recognizing a look up gesture. Level-indication data from at least an accelerometer associated with a wearable computing device (WCD) can be received. The WCD can be worn by a wearer. The WCD can determine whether a head of the wearer is level based on the level-indication data. In response to determining that the head of the wearer is level, the WCD can receive lookup-indication data from at least the accelerometer. The WCD can determine whether the head of the wearer is tilted up based on the lookup-indication data. In response to determining that the head of the wearer is tilted up, the WCD can generate a gesture-recognition trigger, where the gesture-recognition trigger indicates that the head of the wearer has moved up from level.

27 Claims, 25 Drawing Sheets

WEARABLE COMPUTING DEVICE WITH GESTURE RECOGNITION

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays." A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

SUMMARY

In one aspect, a method is provided. A wearable computing device (WCD) receives level-indication data at from at least an accelerometer. The WCD is worn by a wearer. The WCD determines whether a head of the wearer is level relative to gravity based on the level-indication data using the WCD. In response to determining that the head of the wearer is level, the WCD: receives lookup-indication data from at least the accelerometer, determines whether the head of the wearer is tilted up relative to gravity based on the lookup-indication data, and in response to determining that the head of the wearer is tilted up, generates a gesture-recognition trigger. The gesture-recognition trigger indicates that the head of the wearer has moved up from level.

In another aspect, a wearable computing device (WCD) is provided. The WCD includes an accelerometer, a processor, and a computer-readable storage medium having stored thereon program instructions that, upon execution by the processor, cause the WCD to perform operations. The operations include: receiving level-indication data from the accelerometer; determining whether a head of a wearer of the mobile device is level relative to gravity based on the level-indication data; and in response to determining that the head of the wearer is level, receiving lookup-indication data from the accelerometer, determining whether the head of the wearer is tilted up relative to gravity based on the lookup-indication data, and in response to determining that the head of the wearer is tilted up, generating a gesture-recognition trigger, where the gesture-recognition trigger indicates that the head of the wearer has moved up from level.

In yet another aspect, an apparatus is provided. The apparatus includes a computer-readable storage medium having stored thereon program instructions that, upon execution by a computing device, cause the apparatus to perform operations. The operations include: receiving level-indication data from an accelerometer; determining whether a head of a wearer of the apparatus is level relative to gravity based on the level-indication data; and in response to determining that the head of the wearer is level, receiving lookup-indication data from the accelerometer, determining whether the head of the wearer is tilted up relative to gravity based on the lookup-indication data, and in response to determining that the head of the wearer is tilted up, generating a gesture-recognition trigger, wherein the gesture-recognition trigger indicates that the head of the wearer has moved up from level.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
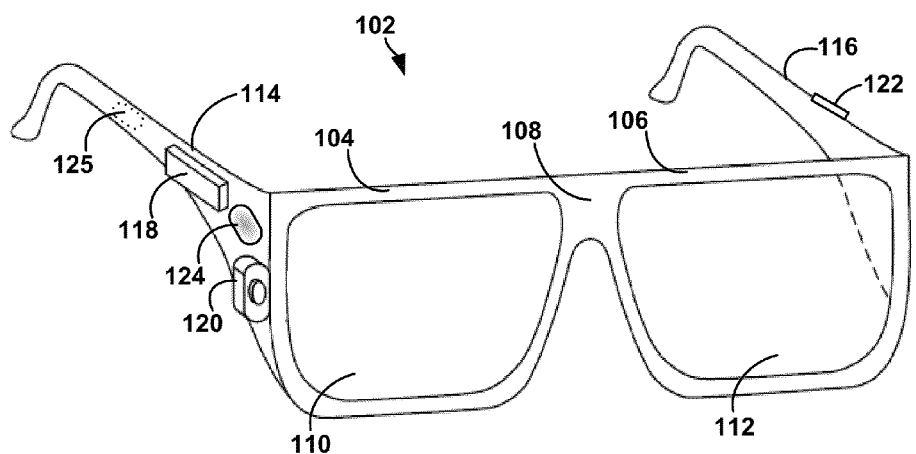
FIG. 1A illustrates a wearable computing device (WCD) according to an example embodiment.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Overview

A WCD can recognize a "look up" gesture of a wearer wearing the WCD. The look up gesture can be expressed as "from a starting position of holding one's head level, look up more than U degrees". The computing device can generate a signal, such as a hardware interrupt, to indicate that the look up gesture has been recognized.

The detection of look up gestures can be a building block for an intuitive user interface to the HMD. For example, many people look down more often than they look up, perhaps to look at papers, screens, displays, etc. Therefore, as looking up is a relatively rare event, detecting a look up gesture can be used, for example, as an easy and memorable trigger for turning on the WCD. Also, in combination with a FSM for detecting a look down gesture, which may be similar to the FSMs described herein for detecting look up gestures, nod gestures can recognized, which can be an intuitive method for signaling "Yes" to the HMD.

As indicated above, one use of look up gesture detection can be to activate the WCD, perhaps while the WCD is in a low power state. In this use case, look up gesture detection can be performed for relatively long periods of time while the WCD is idle. To conserve power and/or battery life, look up gesture recognition can be performed by a computing device operating at low power. In some embodiments, the look up gesture can be recognized using only data obtained from one accelerometer on the WCD to keep this gesture as low power as possible; i.e., by only using accelerometer data, other sensors, such as gyros, are not activated and thus do not consume power. In other embodiments, the look up gesture can be recognized using two sensors to ensure that false positive gesture detections do not occur in accelerated frames of reference.

The look up gesture detector can use a low pass filter (LPF) with outlier rejection on the raw accelerometer data to estimate the direction of the force of gravity as measured by the accelerometer (which should align with "up" with respect to the Earth). This direction will be compared to the principal axes of the device to estimate the orientation of the device with respect to gravity and decide on the angles of the gesture.

The following "device coordinate system" is used herein: when the WCD is level and upright on the wearer's head with the display facing the wearer's eye, +X is right, +Y is up, and +Z is towards the wearer's eye (from the display) such that forward is −Z. In Figures showing the YZ plane, +X is toward the reader and −X is away from the reader.

The wearer can start the look up gesture with his/her head within a tolerance of L degrees of "level" as determined by a low pass filtered accelerometer (henceforth LPFA). The wearer can then tilt his/her head upwards by U degrees (as measured by the LPFA). Once the wearer's head has moved at least U degrees, the hardware interrupt for look up gesture detection can be raised. The interrupt cannot be retriggered until the head once again is within the "level" tolerance. Note: the look up gesture only occurs when the head is tilted upwards by the minimum threshold angle, not downwards.

A finite state machine (FSM) can use three states to recognize the look up gesture, including:
1. Start State (waiting for head to be level)
2. Level State (waiting for head to look up)
3. Recognized (look up gesture interrupt has been triggered)

In the start state, the LPFA is constantly updated. The angle of a normalized LPFA with the expected "up" direction (along a positive component of the Y axis) of the device with respect to gravity in order to test whether an acceleration vector is within a cone of L degrees around the up axis on the device. Once this occurs, the FSM can switch to the level state.

In the level state, the FSM can wait for the acceleration vector to be greater than U degrees beyond from the Y axis and that the X component of the acceleration vector is within R degrees of the X axis. Checking that the acceleration vector is within R degrees of the X axis can ensure that the gesture is a movement without "rolling" left or right. The U degree angle beyond level can describe a "trigger cone" that a vector representing a gesture should cross to generate a gesture-recognition trigger. Once the cone is crossed, the Z component of the acceleration vector can be checked to see if the gesture is a "look up" or "look down" gesture. If the gesture is a look up gesture, the FSM switches to the recognized state.

In the recognized state, a gesture-recognition interrupt is raised. After the gesture-recognition interrupt is raised, the FSM can either remain in the recognized state or go into an optional fourth state to wait for the gesture-recognition interrupt to be cleared. Once the gesture-recognition interrupt has been raised and subsequently cleared, the FSM returns to the level state.

Example Wearable Computing Devices

Systems and devices in which example embodiments may be implemented will now be described in greater detail. In general, an example system may be implemented in or may take the form of a wearable computer (also referred to as a WCD). In an example embodiment, a WCD can take the form of or include a head-mountable device (HMD), which may also be referred to herein as a head-mounted display.

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a WCD according to an example embodiment. In FIG. 1A, the WCD takes the form of HMD 102. It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a wearer's face via a wearer's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a wearer to see through the lens element. Combining these two features of the lens elements may facilitate an augmented reality or heads-up display where the projected image or graphic is superimposed over a real-world view as perceived by the wearer through the lens elements.

The extending side-arms 114, 116 may each be projections that extend away from the lens-frames 104, 106, respectively, and may be positioned behind a wearer's ears to secure the HMD 102 to the wearer. The extending side-arms 114, 116 may further secure the HMD 102 to the wearer by extending around a rear portion of the wearer's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the wearer. This forward facing image captured by the image capture device 120 may then be used to generate an augmented reality where computer generated images appear to interact with or overlay the real-world view perceived by the wearer.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 122 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a wearer to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a wearer when the wearer's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a wearer wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
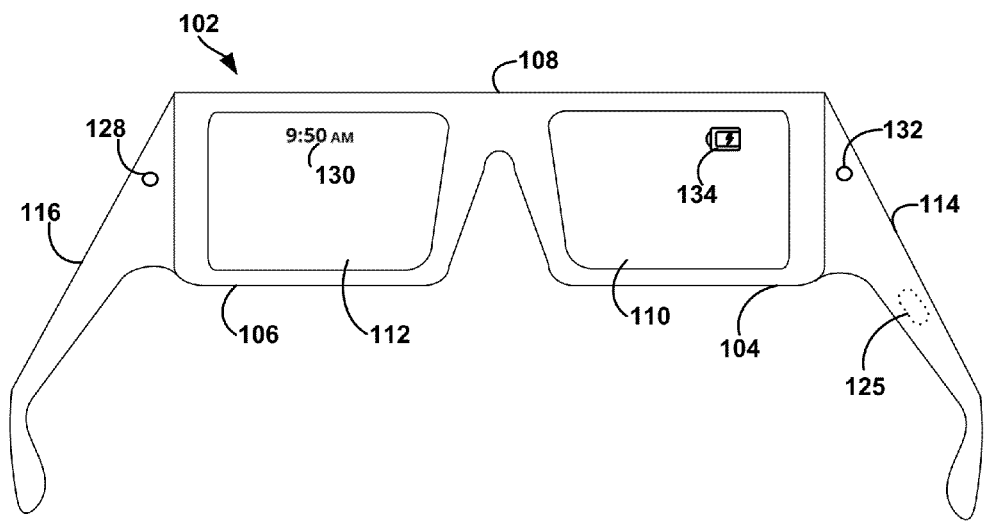
FIG. 1B illustrates an alternate view of the WCD illustrated in FIG. 1A.

FIG. 1B illustrates an alternate view of the WCD illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the wearer's eyes, or other optical elements capable of delivering an in focus near-to-eye image to the wearer. A corresponding display driver may be disposed within the frame elements 104, 106 for driving such a matrix display. Alternatively or additionally, a laser or LED source and scanning system could be used to draw a raster display directly onto the retina of one or more of the wearer's eyes. Other possibilities exist as well.

Figure 1C:
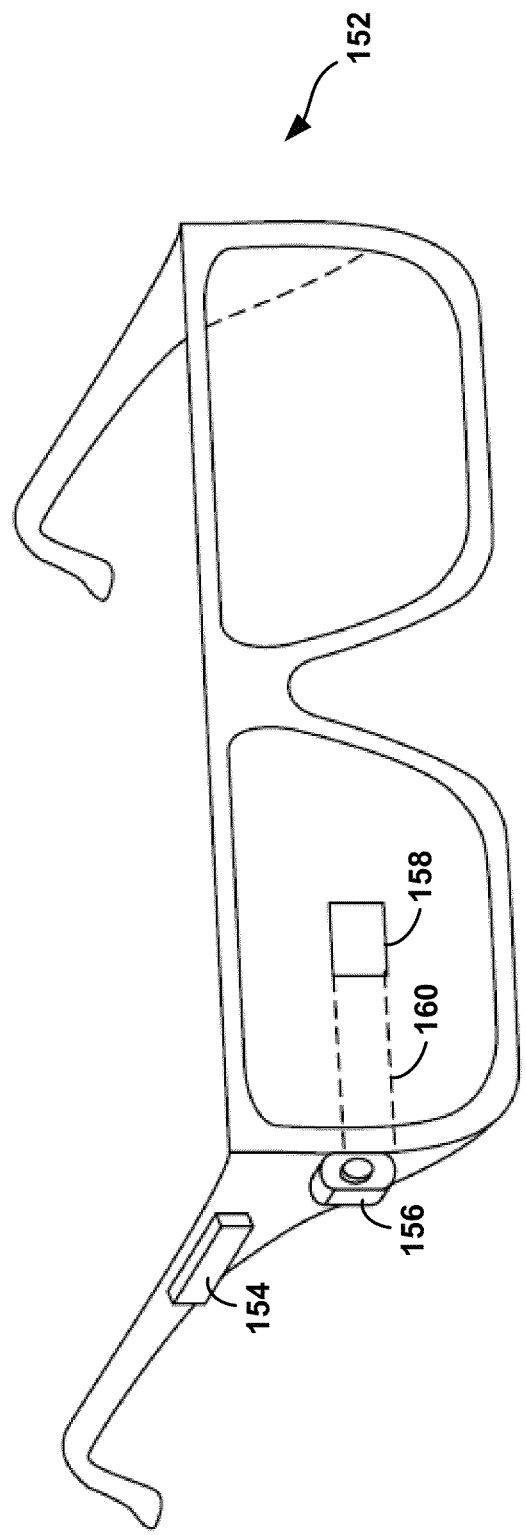
FIG. 1C illustrates another WCD according to an example embodiment.

FIG. 1C illustrates another WCD according to an example embodiment, which takes the form of an HMD 152. The HMD 152 may include frame elements, sensors, and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the wearer's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
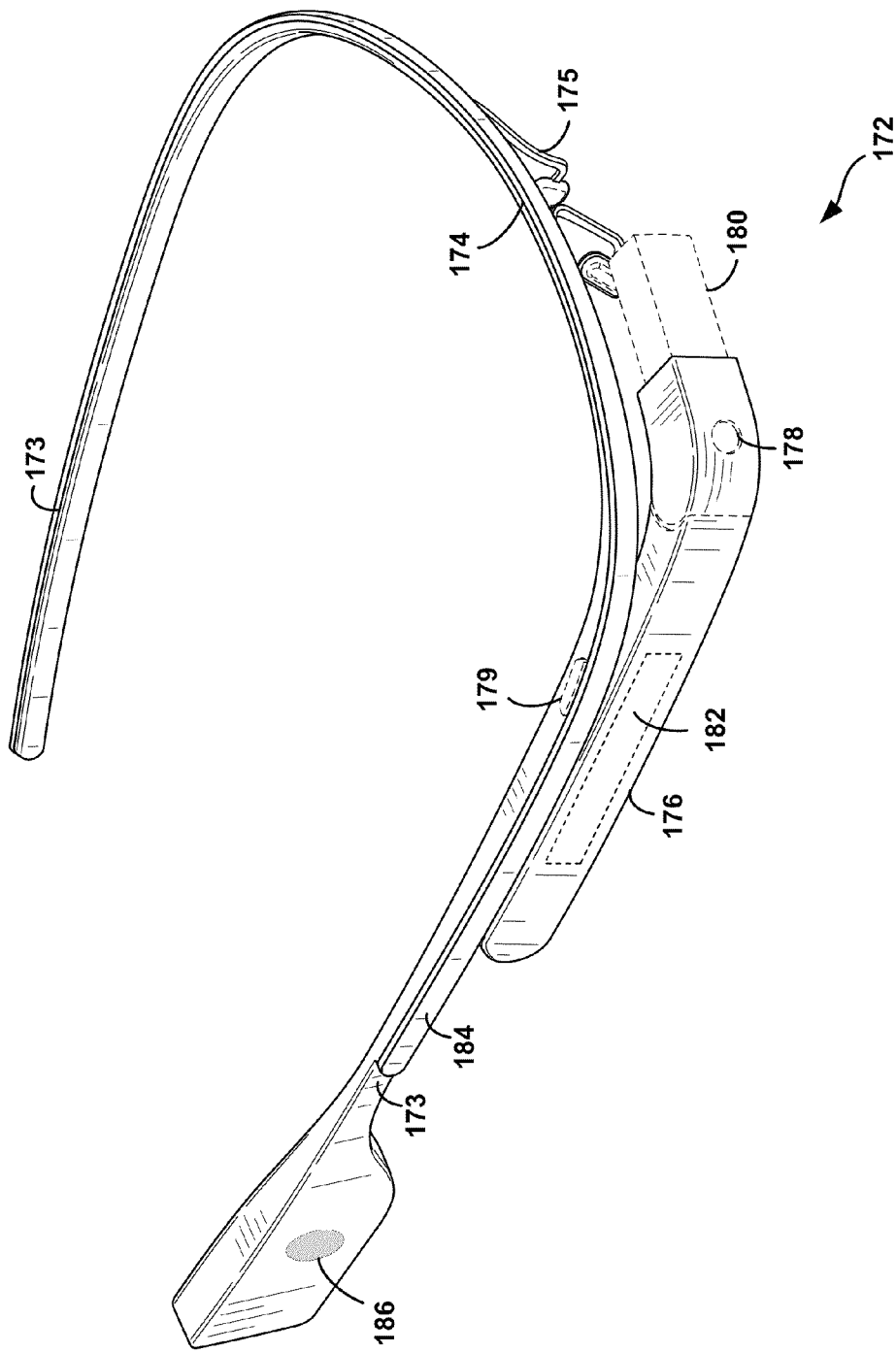
FIG. 1D illustrates another WCD according to an example embodiment.

FIG. 1D illustrates another WCD according to an example embodiment, which takes the form of a monocular HMD 172. HMD 172 can include at least the sensors included on HMD 102 and/or HMD 152. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see his/her environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
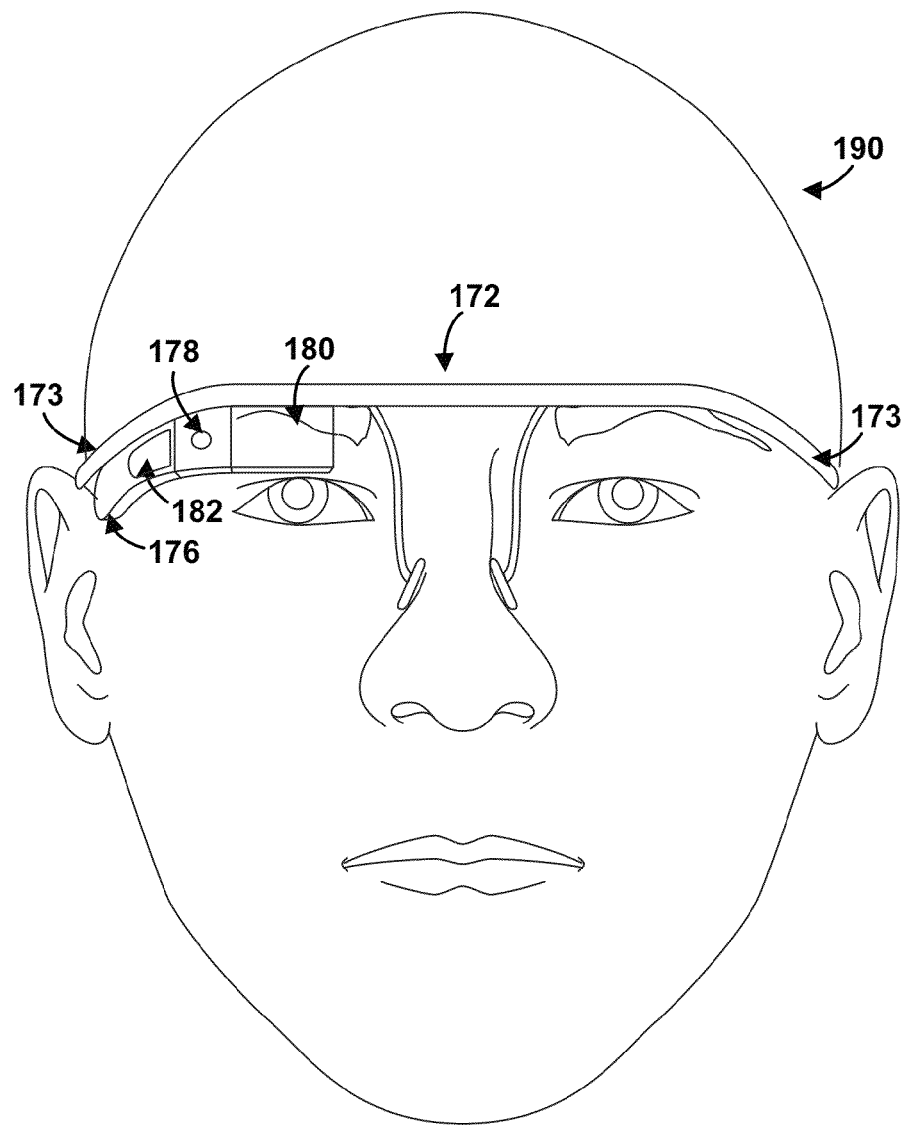
FIGS. 1E to 1G are simplified illustrations of the wearable computing system shown in FIG. 1D, being worn by a wearer.
Figure 1F:
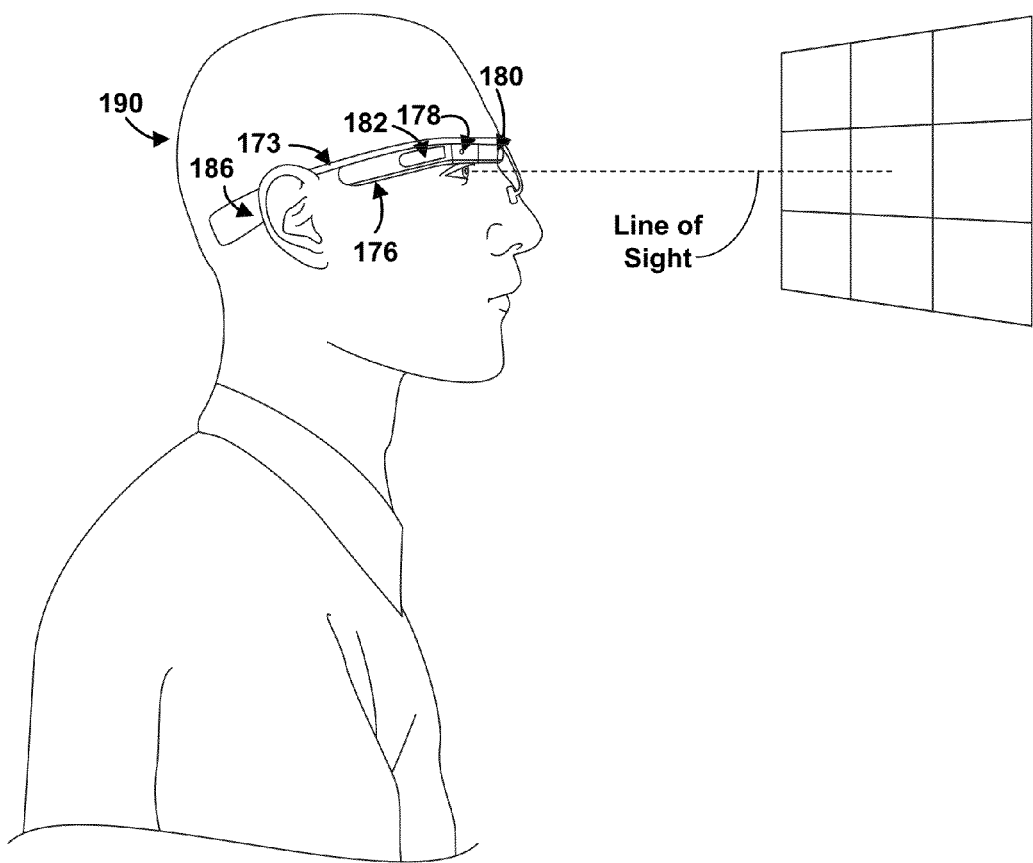
Figure 1G:
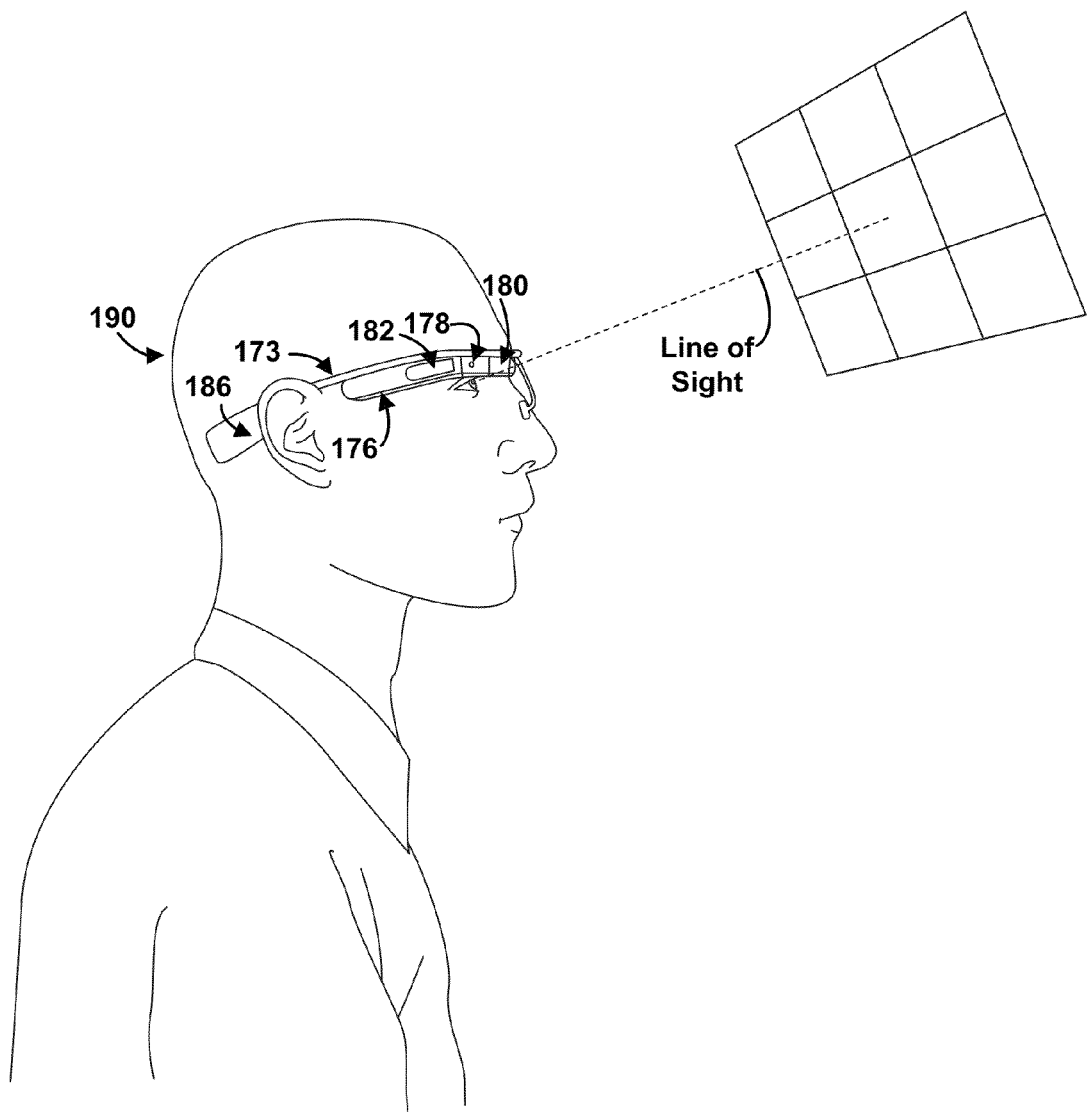

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a wearer's eye when the HMD 172 is worn by the wearer. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with his/her peripheral vision. As a result, display 180 may be outside the central portion of the wearer's field of view when his/her eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with his/her eyes only (possibly without moving his/her head). This is illustrated as shown in FIG. 1G, where the wearer has moved his/her eyes to look up and align the wearer's line of sight with display 180. A wearer might also use the display by tilting his/her head down and aligning the wearer's eye with the display 180.

Figure 2A:
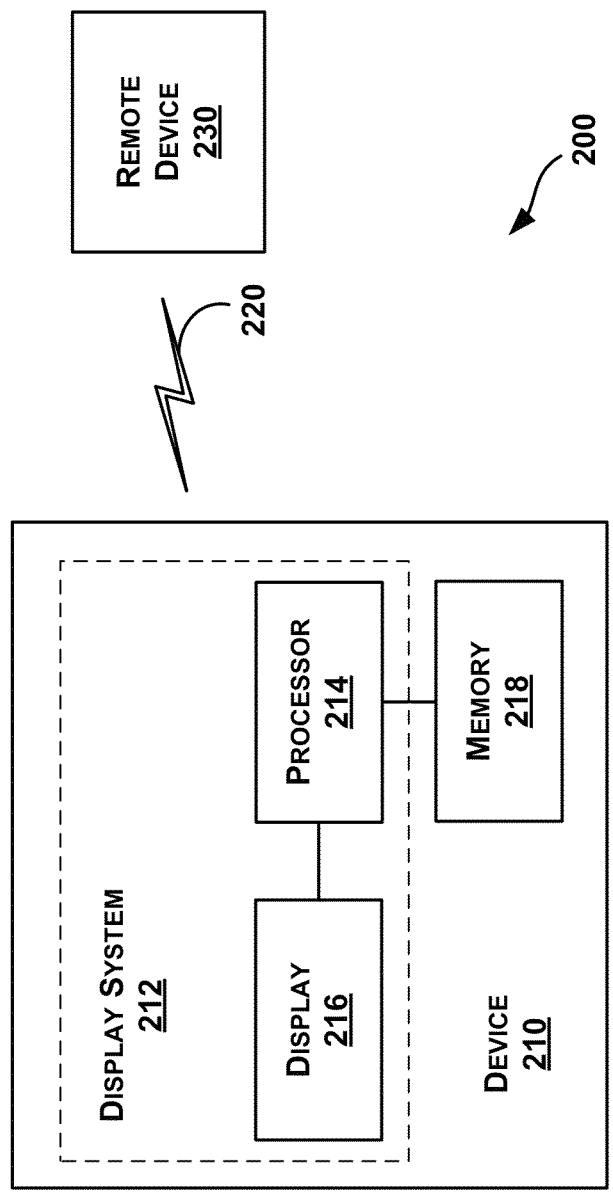
FIG. 2A illustrates a schematic drawing of a computing device according to an example embodiment.

FIG. 2A illustrates a schematic drawing of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client devices, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Example Image Projection

Figure 2B:
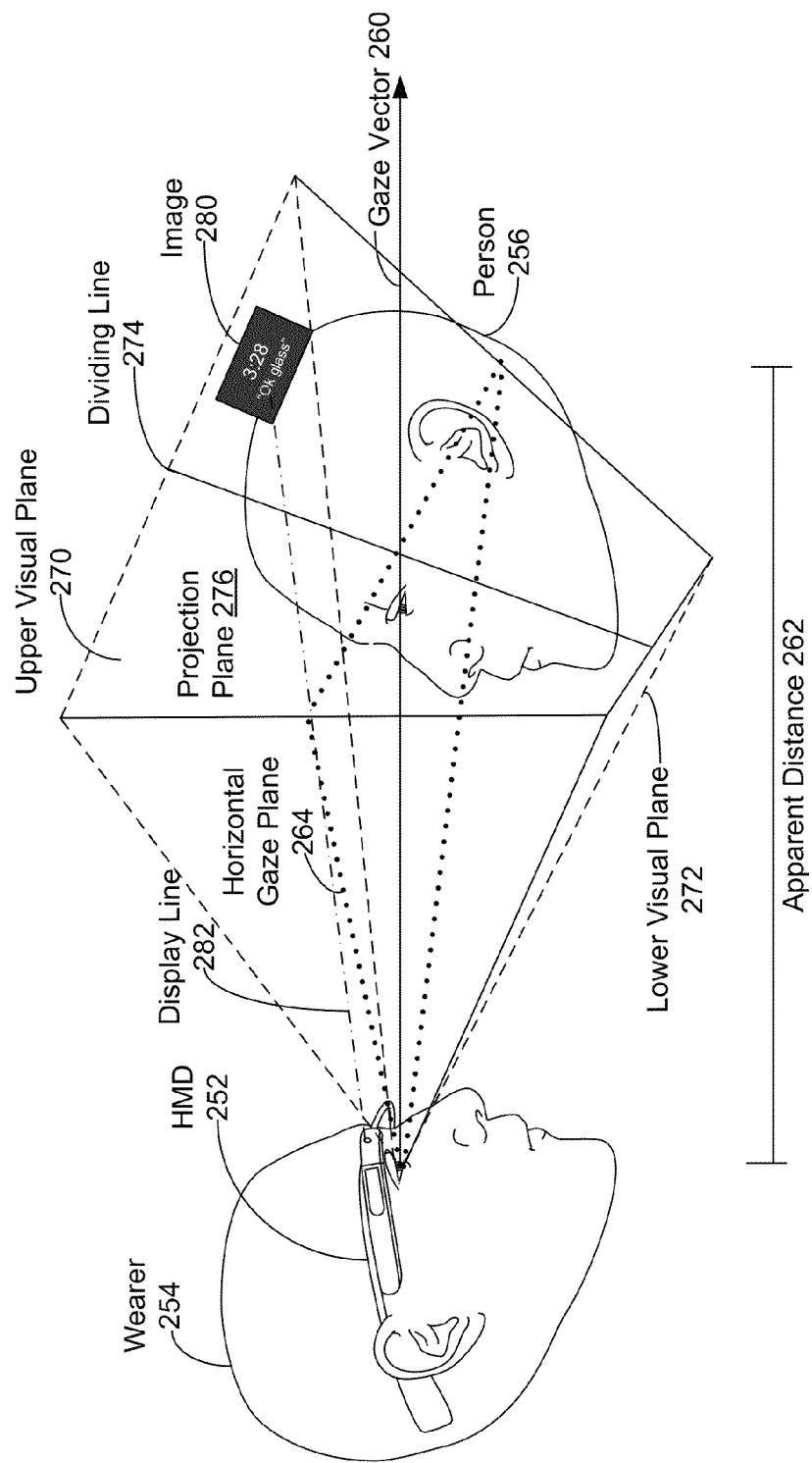
FIG. 2B shows an example projection of an image by an example WCD, according to an example embodiment.

FIG. 2B shows an example projection of UI elements described herein via an image 280 by an example head-mountable device (HMD) 252, according to an example embodiment. Other configurations of an HMD may be also be used to present the UI described herein via image 280. FIG. 2B shows wearer 254 of HMD 252 looking at an eye of person 256. As such, wearer 254's gaze, or direction of viewing, is along gaze vector 260. A horizontal plane, such as horizontal gaze plane 264 can then be used to divide space into three portions: space above horizontal gaze plane 264, space in horizontal gaze plane 264, and space below horizontal gaze plane 264. In the context of projection plane 276, horizontal gaze plane 260 appears as a line that divides projection plane into a subplane above the line of horizontal gaze plane 260, a subplane below the line of horizontal gaze plane 260, and the line where horizontal gaze plane 260 intersects projection plane 276. In FIG. 2B, horizontal gaze plane 264 is shown using dotted lines.

Additionally, a dividing plane, indicated using dividing line 274 can be drawn to separate space into three other portions: space to the left of the dividing plane, space on the dividing plane, and space to right of the dividing plane. In the context of projection plane 276, the dividing plane intersects projection plane 276 at dividing line 274. Thus the dividing plane divides projection plane into: a subplane to the left of dividing line 274, a subplane to the right of dividing line 274, and dividing line 274. In FIG. 2B, dividing line 274 is shown as a solid line.

Humans, such as wearer 254, when gazing in a gaze direction, may have limits on what objects can be seen above and below the gaze direction. FIG. 2B shows an upper visual plane 270 as the uppermost plane that wearer 254 can see while gazing along gaze vector 260, and shows a lower visual plane 272 as the lowermost plane that wearer 254 can see while gazing along gaze vector 260. In FIG. 2B, upper visual plane 270 and lower visual plane 272 are shown using dashed lines.

The HMD can project an image for view by wearer 254 at some apparent distance 262 along display line 282, which is shown as a dotted and dashed line in FIG. 2B. For example, apparent distance 262 can be 1 meter, four feet, infinity, or some other distance. That is, HMD 252 can generate a display, such as image 280, which appears to be at the apparent distance 262 from the eye of wearer 254 and in projection plane 276. In this example, image 280 is shown between horizontal gaze plane 264 and upper visual plane 270; that is image 280 is projected above gaze vector 260. In this example, image 280 is also projected to the right of dividing line 274. As image 280 is projected above and to the right of gaze vector 260, wearer 254 can look at person 256 without image 280 obscuring the wearer's view. In one example, the display element of the HMD 252 is translucent when not active (i.e. when image 280 is not being displayed), and so the wearer 254 can perceive objects in the real world along the vector of display line 282.

Other example locations for displaying image 280 can be used to permit wearer 254 to look along gaze vector 260 without obscuring the view of objects along the gaze vector. For example, in some embodiments, image 280 can be projected above horizontal gaze plane 264 near and/or just above upper visual plane 270 to keep image 280 from obscuring most of wearer 254's view. Then, when wearer 254 wants to view image 280, wearer 254 can move his/her eyes such that the wearer's gaze is directly toward image 280.

Example Methods of Operation

Figure 3:
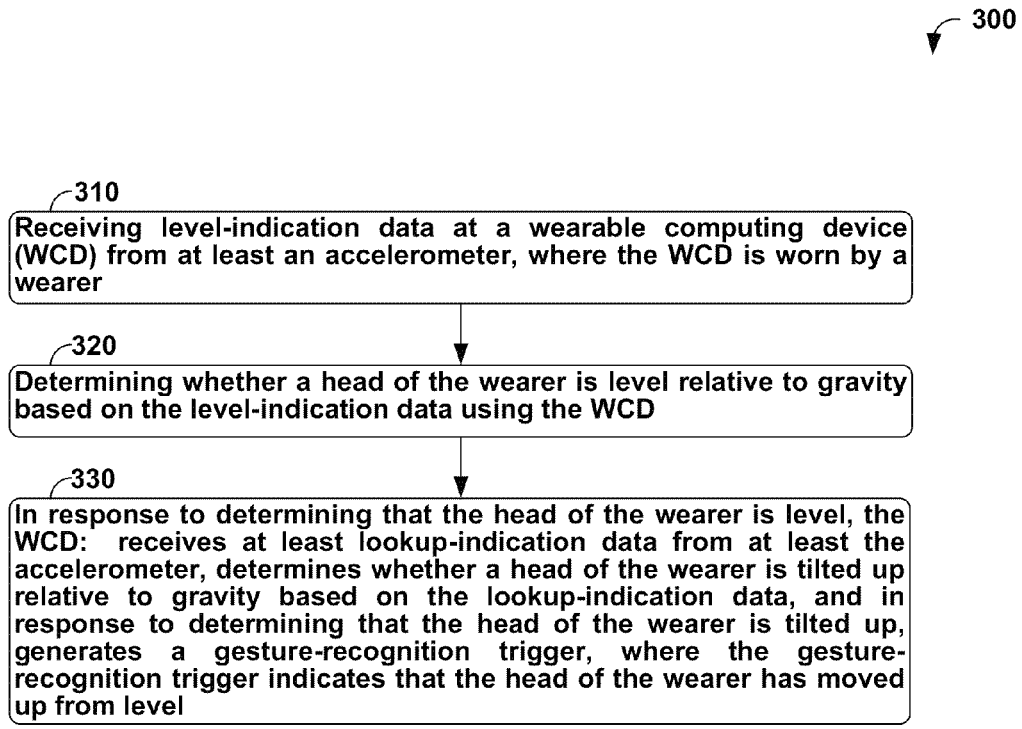
FIG. 3 is a flow chart illustrating a method, according to an example embodiment.

FIG. 3 is a flow chart illustrating a method 300, according to an example embodiment. In FIG. 3, method 300 is described by way of example as being carried out by a wearable computing device (WCD) and possibly a WCD that includes a head-mounted display (HMD). However, it should be understood that example methods, such as method 300, may be carried out by a WCD without wearing the computer. For example, such methods may be carried out by simply holding the WCD using the wearer's hands. Further, example methods, such as method 300, may be carried out by devices other than a WCD, and/or may be carried out by sub-systems in a wearable computer or in other devices. Other possibilities may also exist.

As shown in FIG. 3, method 300 begins at block 310, where a WCD can receive level-indication data from at least an accelerometer. The WCD can be worn by a wearer.

At block 320, the WCD can determine whether a head of the wearer is level relative to gravity based on the level-indication data. In some embodiments, the level-indication data from the at least the accelerometer can include data that can be used to determine that head of the wearer is level relative to a downward gravity vector as measured by at least the accelerometer.

In some embodiments, determining whether the head of the wearer is level can include comparing a magnitude of the level-indication data to a minimum magnitude threshold and a maximum magnitude threshold. In particular embodiments, determining whether the head of the wearer is level can include: determining whether the magnitude of the level-indication data is greater than the maximum magnitude threshold; in response to determining that the magnitude of the level-indication data is greater than the maximum magnitude threshold, determining that the head of the wearer is not level; and in response to determining that the magnitude of the level-indication data is less than the minimum magnitude threshold, determining that the head of the wearer is not level.

In other embodiments, determining whether the head of the wearer is level can include: defining an X-axis, a Y-axis, and a Z-axis for the accelerometer, determining an accelerometer vector based on the level-indication data, the accelerometer vector comprising an X component along the X-axis, a Y component along the Y-axis, and a Z component along the Z-axis; determining a level cone; determining whether the Y component of the accelerometer vector is within the level cone; in response to determining that the Y component of the accelerometer vector is within the level cone, determining that the head of the wearer is level; and in response to determining that the Y component of the accelerometer vector is not within the level cone, determining that the head of the wearer is not level.

In some embodiments, the accelerometer vector is determined based on level-indication data received from a low-pass filtered accelerometer (LPFA). In these embodiments, the accelerometer vector can be an estimate of the direction of gravity using the herein-described device coordinate system.

At block 330, the WCD can, in response to determining that the head of the wearer is level: receive lookup-indication data from at least the accelerometer; determine whether the head of the wearer is tilted up relative to gravity based on the lookup-indication data; and in response to determining that the head of the wearer is tilted up, generate a gesture-recognition trigger, wherein the gesture-recognition trigger indicates that the head of the wearer has moved up from level.

In some embodiments, the lookup-indication data from the at least the accelerometer can include data that can be used to determine that head of the wearer is tilted up relative to a downward gravity vector as measured by the at least the accelerometer.

In some embodiments, determining whether the head of the wearer is tilted up based on the lookup-indication data can include: determining a second accelerometer vector based on the lookup-indication data, the second accelerometer vector comprising an X component along the X-axis, a Y component along the Y-axis, and a Z component along the Z-axis; determining a roll cone about the X-axis; determining whether the X component of the second accelerometer vector is outside of the roll cone; and in response to determining that the X component of the second accelerometer vector is outside of the roll cone, determining that the head of the wearer is not tilted up.

In particular embodiments, the second accelerometer vector is determined based on level-indication data received from a low-pass filtered accelerometer (LPFA). In these embodiments, the second accelerometer vector can be an estimate of the direction of gravity using the herein-described device coordinate system.

In particular embodiments, determining whether the head of the wearer is tilted up based on the lookup-indication data can additionally include: in response to determining that the X component of the second accelerometer vector is inside of the roll cone: determining a lookup-gesture-trigger cone about the Y-axis; determining whether the Y component of the second accelerometer vector is outside of the lookup-gesture-trigger cone; in response to determining that the Y accelerometer component of the second vector is not outside of the lookup-gesture-trigger cone, determining that the head of the wearer is not tilted up; and in response to determining that the Y component of the second accelerometer vector is outside of the lookup-gesture-trigger cone: determining whether the Z component of the second accelerometer vector corresponds to an upwards tilt; in response to determining that the Z component of the second accelerometer vector does not correspond to the upwards tilt, determining that the head of the wearer is not tilted up; and in response to determining that the Z component of the second accelerometer vector does correspond to the upwards tilt, determining that the head of the wearer is tilted up.

In other embodiments, the lookup-indication data can include accelerometer data from the accelerometer and gyroscope data from a gyroscope. Then, determining whether the head of the wearer is tilted up based on the lookup-indication data can include: determining an accelerometer vector based on the accelerometer data; determining whether the head of the wearer has apparently tilted up based on the accelerometer vector; determining whether the head of the wearer has rotated based on the rotation data; in response to either determining that the head of the wearer has not apparently tilted up based on the accelerometer vector or determining that the head of the wearer has not rotated based on the rotation data, determining that the head of the wearer is not tilted up; and in response to determining that the head of the wearer has apparently tilted up based on the accelerometer vector and determining that the head of the wearer has rotated based on the rotation data, determining that the head of the wearer is tilted up.

In still other embodiments, the lookup-indication data can include first accelerometer data from the (first) accelerometer and second accelerometer data from a second accelerometer. The second accelerometer can be located closer to a pivot point of the head of the wearer than the accelerometer. Then, determining whether the head of the wearer is tilted up based on the lookup-indication data can include: defining an X-axis, a Y-axis, and a Z-axis for the WCD; determining a first accelerometer vector based on the first accelerometer data, the first accelerometer vector including a first Y-component along the Y-axis; determining a second accelerometer vector based on the second accelerometer data, the second accelerometer vector comprising a second Y-component along the Y-axis; determining an absolute value of an accelerometer vector difference (AVD) between the first and second accelerometer vectors, determining whether an absolute value of the AVD exceeds an AVD threshold; determining a Y-component difference between the first Y-component and the second Y-component; in response to either determining that that the Y-component difference is not positive or determining that the absolute value of the AVD does not exceed the AVD threshold, determining that the head of the wearer is not tilted up; and in response to determining that that the Y-component difference is positive and determining that the absolute value of the AVD does exceed the AVD threshold, determining that the head of the wearer is tilted up.

In still other embodiments, the lookup-indication data can include accelerometer data from the accelerometer and magnetic-field data from a magnetometer. In these embodiments, determining whether the head of the wearer is tilted up based on the lookup-indication data can include: determining an accelerometer vector based on the accelerometer data; determining whether the head of the wearer has apparently tilted up based on the accelerometer vector; verifying whether the head of the wearer has tilted up based on the magnetic-field data; in response to either determining that the head of the wearer has not apparently tilted up based on the accelerometer vector or not verifying that the head of the wearer has tilted up based on the magnetic-field data, determining that the head of the wearer is not tilted up; and in response to determining that the head of the wearer has apparently tilted up based on the accelerometer vector and verifying that the head of the wearer has tilted up based on the magnetic-field data, determining that the head of the wearer is tilted up.

In some embodiments, method 300 can also include: in response to the gesture-recognition trigger, generating a gesture-recognition interrupt.

Example Techniques for Detecting a Look Up Gesture

A "look up" gesture can be recognized while a wearer is wearing a head-mountable display (HMD). Specifically, a look up gesture can be of the form: "the wearer starting at a position of holding his/her head level and then looking up more than U degrees". The look up gesture-recognition techniques can use devices and computational operations that use relatively low power. A trigger and/or a hardware interrupt can be raised in response to detecting the look up gesture. In some cases, the trigger can be the hardware interrupt.

In one embodiment; e.g., WCD 410, the look up gesture can be recognized using only data obtained from one accelerometer. Use of one accelerometer can keep gesture-recognition as low power as possible; i.e., by only using accelerometer data from one accelerometer, other sensors, such as gyroscopes, are not activated and thus do not consume power. The gesture detector can use a low pass filter (LPF) with outlier rejection on the raw accelerometer data to estimate the direction of the force of gravity as measured by the accelerometer (which should align with "up" with respect to the Earth). This direction will be compared to the principal axes of the device to estimate the orientation of the device with respect to gravity and decide on the angles of the gesture.

In embodiments where the WCD can enter into an accelerated reference frame, such as in a vehicle that accelerates while starting and stopping, additional sensor data may be required to verify recognition of gestures made by the one accelerometer. In a second embodiment; e.g., WCD 610, two accelerometers are used to detect look up gestures in both accelerated reference frames and non-accelerated reference frames. In a third embodiment; e.g., WCD 710, an accelerometer and a gyroscope are used to detect look up gestures in both accelerated reference frames and non-accelerated reference frames. In the latter two embodiments, power saving techniques can be utilized, such as only turning on a second accelerometer or gyroscope when needed.

An Example Lookup Gesture Scenario

Figure 4A:
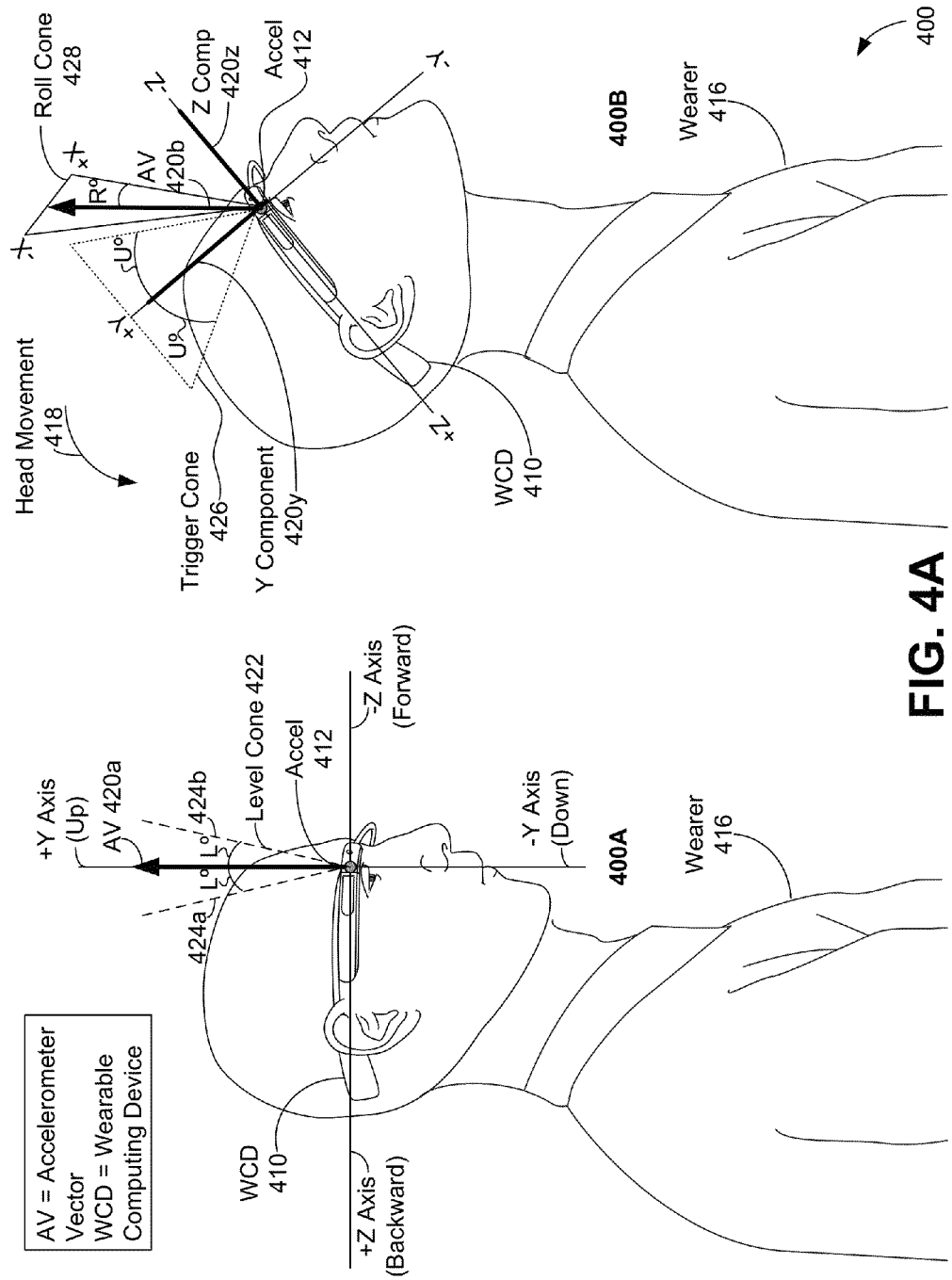
FIGS. 4A and 4B shows a scenario of a wearer wearing a WCD having one accelerometer while the wearer's head tilts up, according to an example embodiment.

FIG. 4A shows a scenario 400 of wearer 416 wearing WCD 410 while first holding his/her head level and then tilting his/her head up. Scenario 400 starts at 400A with wearer 416 wearing WCD 410 having accelerometer 412. Accelerometer 412 can generate acceleration data, such as an acceleration vector (AV). FIG. 4A shows AV 420a aligned with a Y-axis. In this example, WCD 410 is level, so AV 420a is straight up in response to the downward force of gravity (i.e., the downward force of gravity is equivalent to an upward acceleration). As such, AV 420a is within a level cone 422. Level cone 422 is a cone of points within L degrees of the +Y axis. FIG. 4A shows level cone 422 in the XY plane being bounded by lines 424a and 424b. Then, a head of wearer 416 can be determined to be level when AV 420a is within L degrees of the +Y axis, or equivalently, when AV 420a is within level cone 422.

At 400B, wearer 416 tilts his/her head upwards by at least U degrees while keeping his/her head within a roll cone of R degrees on either side of the YZ plane, as measured by accelerometer 412 and shown in FIG. 4A using AV 420b. In response to this look up gesture, WCD 410 can trigger a gesture-recognition interrupt after the head of wearer 416 moves up by at least U degrees. The gesture-recognition interrupt is not retriggered until the head once again is within the "level" tolerance.

Checking that the acceleration vector is within R degrees of the Y axis can ensure that the gesture is a movement without "rolling" left or right. In some embodiments, a sideways roll, or moving more than R degrees away from the Y axis while wearer 416 can be treated a gesture that differs from the look up gesture.

Figure 4B:
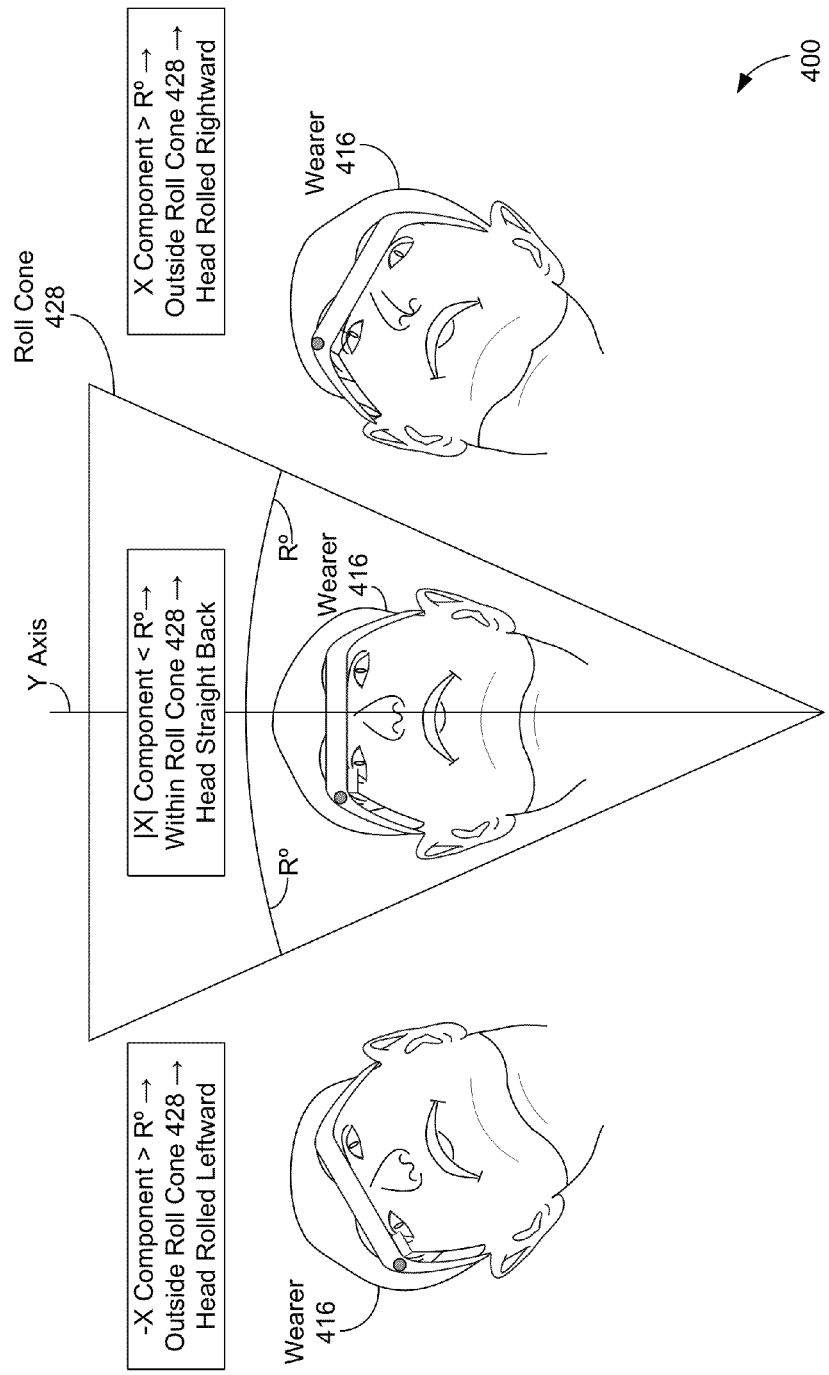

FIG. 4B shows, as part of scenario 400, how roll cone 428 can be used to detect sideways roll by wearer 416 while looking up. FIG. 4B shows the XY plane with the Y axis near the center of the Figure with positive X components to the right of the Y axis and negative X components to the left of the Y axis. Surrounding the Y axis in FIG. 4B is roll cone 428, which includes the region within R degrees in the X direction on either side of the Y axis.

When wearer 416 tilts his/her head straight back, as shown in the middle of FIG. 4B, the absolute value of the X component of the accelerometer vector has a value that is less than R degrees, indicating that the head of wearer 416 is within R degrees of the Y axis. As the X component is within R degrees of the Y axis, the X component is within roll cone 428, indicating a straight back movement by the head of wearer 416.

When wearer 416 tilts his/her head to the left while tilting upward, as shown on the left side of FIG. 4B, the X component of the accelerometer vector has a negative value that, when negated, indicates that a position of the head of wearer 416 deviates more than R degrees from the Y axis and so is outside roll cone 428.

When wearer 416 tilts his/her head to the right while tilting upward, as shown on the right side of FIG. 4B, the X component of the accelerometer vector has a positive value that indicates that a position of the head of wearer 416 deviates more than R degrees from the Y axis and so is outside roll cone 428.

That is, when wearer 416 tilts his/her head far enough to either the left or right while tilting upward, the absolute value of the magnitude of the X component can be large enough to indicate a sideways roll by the head of wearer 416. If the X component is negative, the sideways roll can be determined to be a leftward roll, as the X component is expressed using the herein-described device coordinate system. If the X component is positive, the sideways roll can be determined to be a rightward roll.

In this example, WCD 410 triggers the gesture-recognition interrupt only when the head of wearer 416 is tilted upwards by the minimum threshold angle, not downwards, and that the head of wearer 416 is within roll cone 426. To ensure that the gesture is upward, WCD 410 can perform a sign check of AV 420b to determine that the head tilt is a tilt upward. In particular, if a sign check of a Z component of AV 420b indicates the Z component of AV 420b is negative, using the herein-described device coordinate system and shown in FIG. 4A, then the head tilt by wearer 416 in scenario 400 is a tilt upward.

An Example Finite State Machine

Figure 4C:
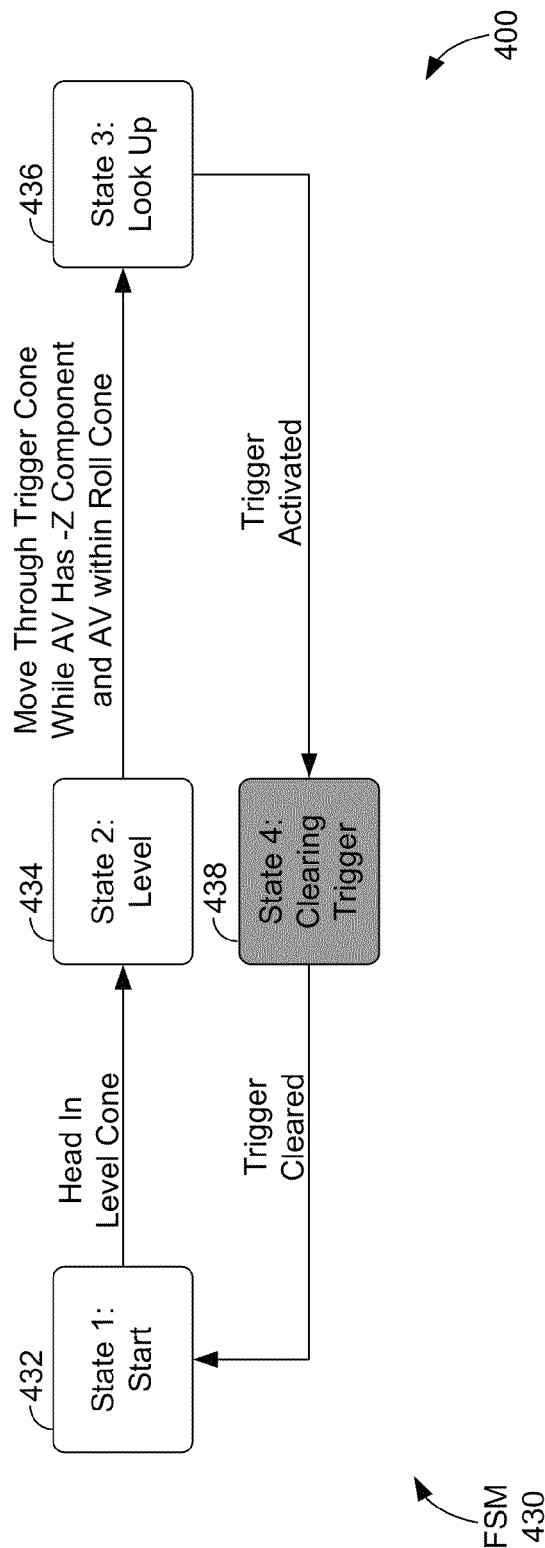
FIG. 4C shows an example finite state machine (FSM) for recognizing a look up gesture using one accelerometer, according to an example embodiment.

FIG. 4C shows an example finite state machine (FSM) 430 that can be used to recognize the look up gesture. In some embodiments, a computing device, such as WCD 410, can be configured to perform the tasks described herein as being performed by FSM 430.

FIG. 4C shows FSM 430 with four states. In the FSMs depicted in the Figures, non-optional states are colored in white while optional states are colored in grey. The three non-optional states are:
1. Start State, shown in FIG. 4C as state 432, for waiting for the head of wearer 416 to be level,
2. Level State, shown in FIG. 4C as state 434, for waiting for the head of wearer 416 to look up,
3. Look Up State, shown in FIG. 4C as state 436, for triggering the gesture-recognition interrupt upon detection of the lookup gesture.

The optional state is:
4. Clearing Trigger State, shown in FIG. 4C as state 438, for awaiting clearing of the gesture-recognition interrupt.

In start state 432 shown in FIG. 4C, accelerometer 412 can provide updates which can be screened for acceptable data. Data from accelerometer 412 can be treated as unacceptable when the data is rejected whose magnitude is an outlier; e.g., too far away from the expected gravity value (9.81 m/s$^2$). In scenarios where data is collected frequently from accelerometer 412, e.g., more than once per second, accelerations due to movement can cause these outliers, and the outliers can have an excessive effect on filtered accelerometer data in the short term e.g., within 5-10 seconds of the outlier. In these scenarios, the outliers can be rejected to mitigate the short term effects on the filtered accelerometer data.

X, Y, and Z axes can be defined for WCD 610 using the above-mentioned device coordinate system; e.g. right, up, and forward are device coordinate directions shown in FIG. 4A as right=+X, up=+Y, and forward=−Z. Then, data from accelerometer 412 can be used to generate a "normalized low pass filtered accelerometer" (NLPFA) variable, shown in the figures as an "accelerometer vector" that illustrates and is responsive to the forces on the accelerometer; e.g., gravity, acceleration due to vehicle starts/stops, etc. For example, accelerometer vector (AV) 420a is shown in the +Y direction as being responsive to gravity.

At 400A at FIG. 4A, level cone 422 is shown for testing using device coordinates around AV 420a. Level cone 422 is defined as being within L degrees of the +Y axis AV 420a. AV 420a must be inside level cone 422 to permit changing state from start state 432 to level state 434 of FIG. 4C. In some embodiments, level cone 422 can also include a hysteresis zone outside of level cone 422.

In level state 434 shown in FIG. 4C, accelerometer 412 continues to provide angle and acceleration data for generating accelerometer vectors, such as AV 420b shown at 400B of FIG. 4A. While in level state 434, FSM 430 waits for an angle between the +Y axis and the accelerometer vector to be greater than predetermined Y angle threshold; e.g., greater than U degrees from the +Y axis. The predetermined Y angle threshold describes a cone about the Y axis, shown in FIG. 4A as trigger cone 426, that AV 420b should go outside of to generate a gesture-recognition trigger and/or the gesture-recognition interrupt. FSM also waits for an angle between the X axis and the accelerometer vector to be less than a predetermined X angle threshold; e.g., within R degrees of the X axis. The predetermined X angle threshold describes a cone about the X axis, shown in FIGS. 4A and 4B as roll cone 428, that AV 420b should stay within to generate a gesture-recognition trigger and/or the gesture-recognition interrupt.

Once AV 420b goes outside of trigger cone 426 while staying within roll cone 428, the sign of a Z component of the AV 420b can be tested to determine whether WCD 410 is tilting upwards. As shown in FIG. 4A, WCD 410 is tilting upwards when AV 420b has a negative Z component 420z. If AV 420b is outside of trigger cone 426 and if WCD 410 is tilting upwards, then FSM 430 can switch to look up state 436.

In look up state 436 shown in FIG. 4C, the lookup gesture-recognition trigger can be activated. In some embodiments, gesture-recognition trigger activation can lead to raising the gesture-recognition interrupt. In other embodiments, where the gesture-recognition interrupt is the gesture-recognition trigger, activation of the gesture-recognition trigger is performed by raising the gesture recognition interrupt.

In some embodiments, after gesture-recognition trigger activation and raising the gesture-recognition interrupt, FSM 430 can switch from look up state 436 to clearing trigger state 438. While in clearing trigger state 438, FSM 430 waits for the gesture-recognition interrupt to be cleared before switching to start state 432.

In other embodiments, after gesture-recognition trigger activation and raising the gesture-recognition interrupt, FSM 430 can switch from look up state 436 to start state 432. In still other embodiments, FSM 430 waits for the gesture-recognition interrupt to be cleared before switching from look up state 436 to start state 432.

Example Techniques for Detecting a Look Up Gesture in Accelerated Reference Frames From the point of view of an accelerometer, a look up gesture appears to be an acceleration in the −Z direction, according to the axes shown in FIG. 4A. However, in other contexts, such as riding in an accelerating vehicle, the accelerometer may detect an acceleration in the −Z direction. In such cases, a second sensor can be used to verify that a look up gesture has actually occurred.

Figure 5:
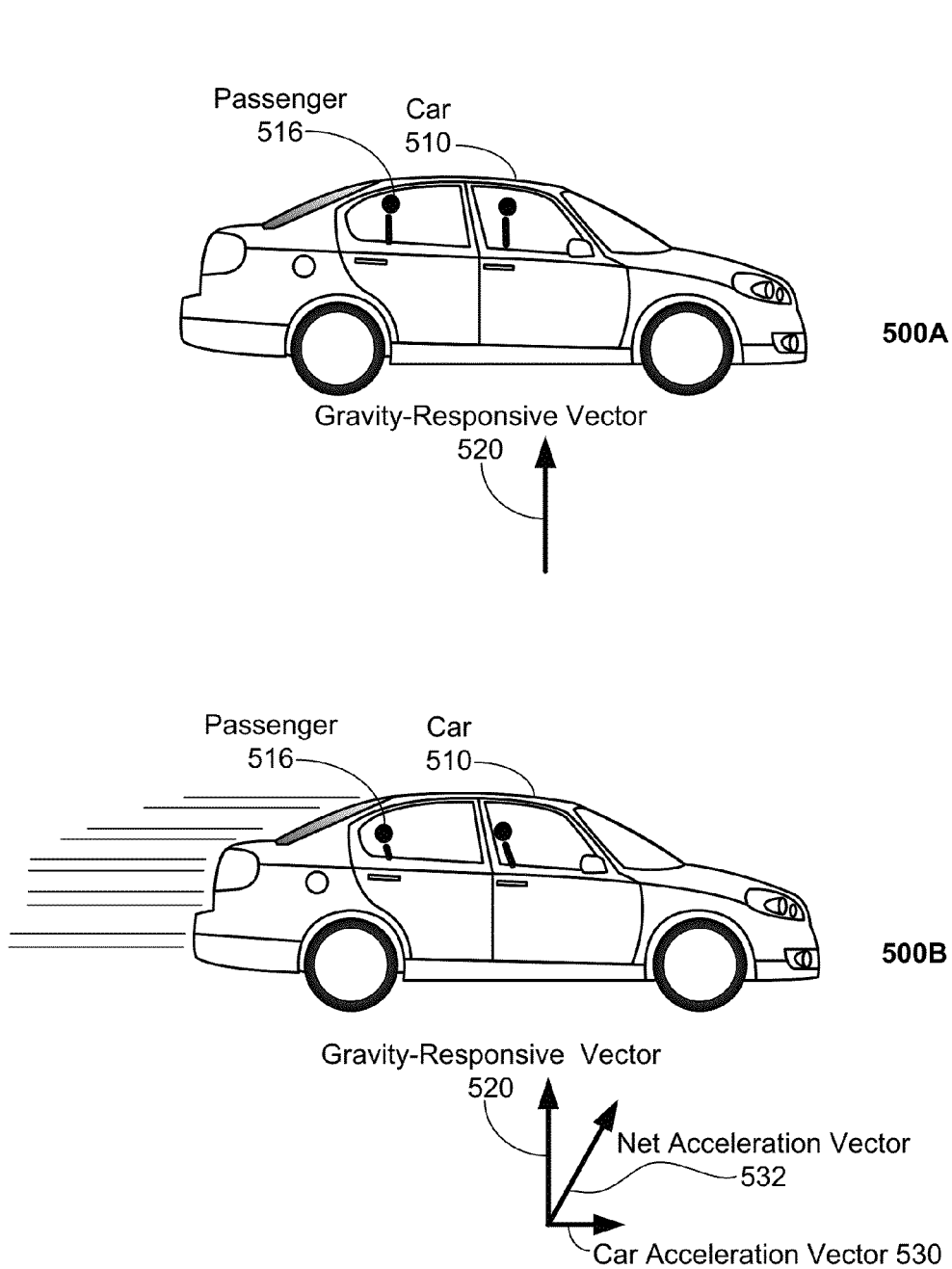
FIG. 5 shows an example scenario related to an accelerated reference frame, according to an example embodiment.

FIG. 5 shows scenario 500, which is related to an accelerated reference frame. Scenario 500 begins at 500A where a vehicle, shown in FIG. 5 as car 510, is at rest with passenger 516 inside on the surface of the Earth. Below the diagram of car 510 at 500A, FIG. 5 shows that an accelerometer on car 510 can measure a gravity-responsive vector 520 in an upward direction in response to the downward force of gravity.

Scenario 500 continues with car 510 moving and accelerating forward; e.g., from left to right on FIG. 5. Below the diagram of car 510 at 500A, FIG. 5 shows that net acceleration vector 532 can be a vector sum of gravity-responsive vector 520 in the up direction and car acceleration vector 530 in the forward direction, which represents the net force acting on a head of passenger 516 in card 510. In some scenarios, net acceleration vector 532 can appear to an accelerometer be a result of a look up gesture, even though passenger 516 did not tilt his/her head upward.

Figure 6A:
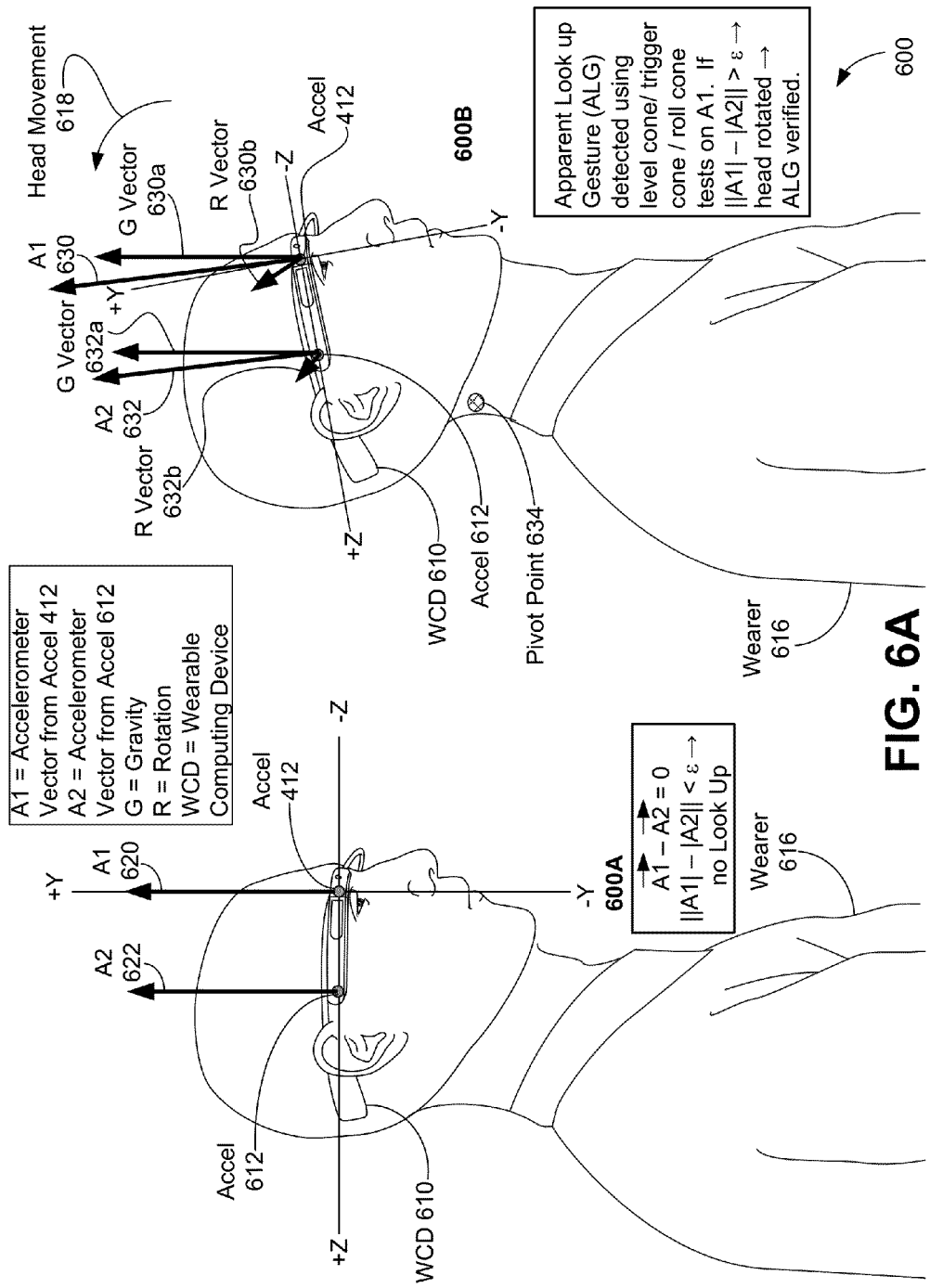
FIGS. 6A and 6B show a scenario in which a wearer wears a WCD configured with two accelerometers, tilts his/her head up, and then wears the WCD in an accelerated reference frame, according to an example embodiment.
Figure 6B:
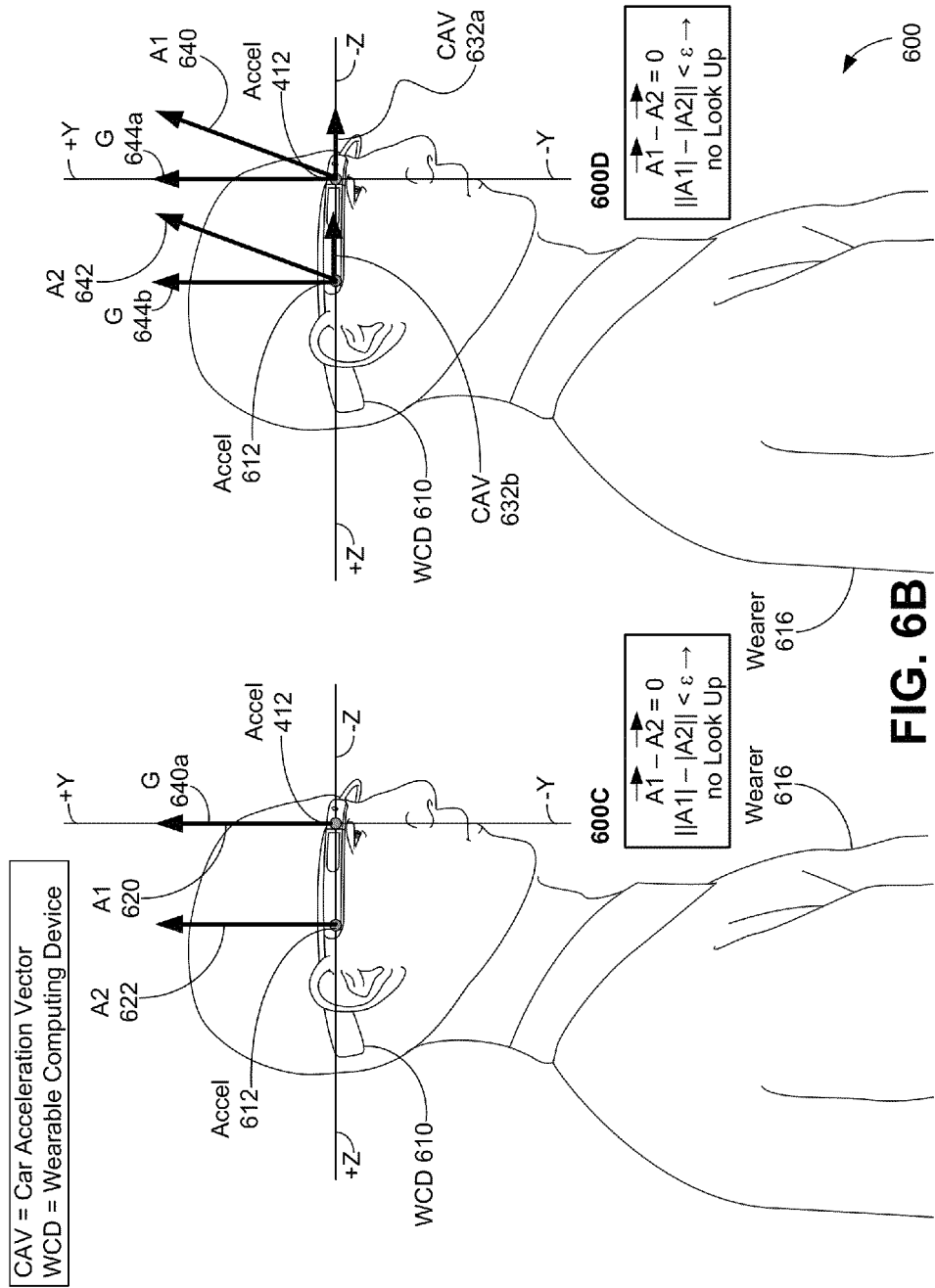

In some cases, two accelerometers can be used to detect and verify look up gestures in accelerated reference frames and non-accelerated reference frames. FIGS. 6A and 6B show scenario 600, where wearer 616 wears WCD 610 configured with accelerometers 412 and 612, tilts his/her head up, and then wears WCD 610 in an accelerated reference frame.

As shown in FIG. 6A, scenario 600 begins at 600A with wearer 616 wearing HMD 610 in a level position in an unaccelerated reference frame; for example, wearer 616 can be standing or sitting still. HMD 610 is equipped with at least two accelerometers—accelerometer 412 and accelerometer 612. While in operation, accelerometer 412 generates acceleration data that when normalized and screened for acceptable data as discussed above in the contexts of FIGS. 4A and 4C, leads to representation as acceleration vector A1 during scenario 600 and as shown in FIGS. 6A through 6D. Similarly, accelerometer 612 generates acceleration data that when normalized and screened for acceptable data leads to representation as acceleration vector A2 during scenario 600 and as shown in FIGS. 6A through 6D.

While at rest in an unaccelerated reference frame, A1 and A2 are both upward vectors responsive to the Earth's gravity. As such, the magnitude and direction of A1 should be equal to the magnitude and direction of A2, and so at 600A, the A1 vector equals the A2 vector, at least within a sensor threshold value that accounts for fluctuations in sensor readings.

Scenario 600 continues at 600B with wearer 616 beginning head movement 618 to perform a look up gesture. FIG. 6A shows that both accelerometers 412 and 612 are on a side arm of WCD 610, with accelerometer 612 near an ear of wearer 616 and accelerometer 412 near an eye of wearer 616. During scenario 600, the head of wearer 616 is assumed to move around a pivot point, indicated as pivot point 634, to perform the look up gesture. As shown in FIG. 6A, accelerometer 612 is nearer pivot point 634 than accelerometer 412, and so angular acceleration due to the look up gesture measured at accelerometer 612 is considerably less than measured at accelerometer 412.

FIG. 6A shows that, at 600B, the net acceleration measured by accelerometer 412 is a resultant of an upward gravity-responsive vector, represented as G vector 630a, and an acceleration due to head movement 618, represented as R vector 630b. The net accelerometer vector due to G vector 630a and R vector 630b is shown as A1 vector 630. Also, at 600B, the net acceleration measured by accelerometer 612 is a resultant of G vector 632a and R vector 632b, with the net accelerometer vector due to G vector 632a and R vector 632b shown as A2 vector 632. Note that G vectors 630a and 632a are equal, but R vector 630b at accelerometer 412 has a greater magnitude than R vector 632b at accelerometer 612. As a result, A1 vector 630 has a greater magnitude than A2 vector 632.

To determine if a look up gesture has taken place, WCD 610 can perform the level cone, trigger cone, roll cone, and Z component tests on the A1 vector, such as discussed in the context of FIGS. 4A, 4B, 4C. Then, if these tests indicate that wearer 616 has performed an apparent look up gesture (ALG), WCD 610 can verify the ALG using an absolute value of the difference between the magnitude of A1 and the magnitude of A2, or $||A1|-|A2||$. $||A1|-|A2||$ can be compared to a (small) threshold value; e.g., the sensor threshold value, or a new threshold value $\epsilon$ (epsilon).

If $||A1|-|A2||$ is greater than the threshold value (shown in FIG. 6A as $\epsilon$), then the head of wearer 616 has experienced more acceleration at accelerometer 412 than at accelerometer 612, indicating that the head of wearer 616 has rotated and so verifying the previously-detected ALG. However, if $||A1|-|A2||$ is not greater than the threshold value, then the magnitude of the acceleration measured at accelerometer 412 is approximately or actually equal to the magnitude of the acceleration measured at accelerometer 612, such as shown at 600A, and so the ALG is not verified. In some embodiments, the absolute value of the difference between the magnitude of A1 and the magnitude of A2 can be determined using unfiltered accelerometer data compared to the threshold value over a window of time near a time that the apparent look up gesture is detected.

In some embodiments, a look up gesture can be differentiated from a look down gesture using the Y components of A1 and A2. If the head of wearer 616 has rotated, let $A1_y$ be the Y component of A1, and $A2_y$ be the Y component of A2. If $A1_y-A2_y>0$, that is, if the difference between Y components of A1 and A2 is positive, the rotation of the head of wearer 616 is in the +Y direction, and so a look up gesture has been performed. However, if $A1_y-A2_y<0$, the rotation of the head of wearer 616 is in the −Y direction, and so a look down gesture has been performed. In scenario 600, wearer 616 performed a look up gesture at 600B, and so $A1_y-A2_y>0$.

Scenario 600 continues with wearer 616 looking down to return his/her head to level upon entering a car and sitting at rest, as shown in FIG. 6B at 600C. Scenario 600 continues at 600D where the car carrying wearer 616 accelerates forward.

As such, at 600D, wearer 616 has entered into an accelerated frame of reference. FIG. 6B shows that at 600D, accelerometers 412 and 612 measure accelerometer vectors that result from gravity-responsive vectors, shown in FIG. 6B as respective gravity-responsive vectors 644a and 644b, and acceleration due to the accelerating car, shown in FIG. 6B as respective car acceleration vectors (CAVs) 632a and 632b. The angles and acceleration measured by accelerometers 412 and 612 are represented at 600D of FIG. 6B as respective vectors A1 640 and A2 642.

Accelerometers 412 and 612 detect the same gravity and car accelerations. As such, A1 640 and A2 642 are shown in FIG. 6B as having the same direction and magnitude. Thus, at 600D, ||A1|−|A2||, the absolute value of the difference between the magnitude of A1 and the magnitude of A2, is less than the threshold ϵ applied at 600B. When acceleration in an accelerated frame of reference leads to an apparent look up gesture detection by accelerometer 412 based on A1, the absolute value of the difference between A1 and A2 can be checked. If the absolute value of the difference between A1 and A2 is (nearly) 0, as at 600D, then WCD 610 can determine that the head of wearer 616 did not rotate, and so the apparent look up gesture detection is a false positive.

FSM 430, discussed above for use with WCD 410, can be modified for use with a WCD such as WCD 610 that has two accelerometers that detects look up gestures accurately in both accelerated frames of reference and unaccelerated frames of reference.

Figure 6C:
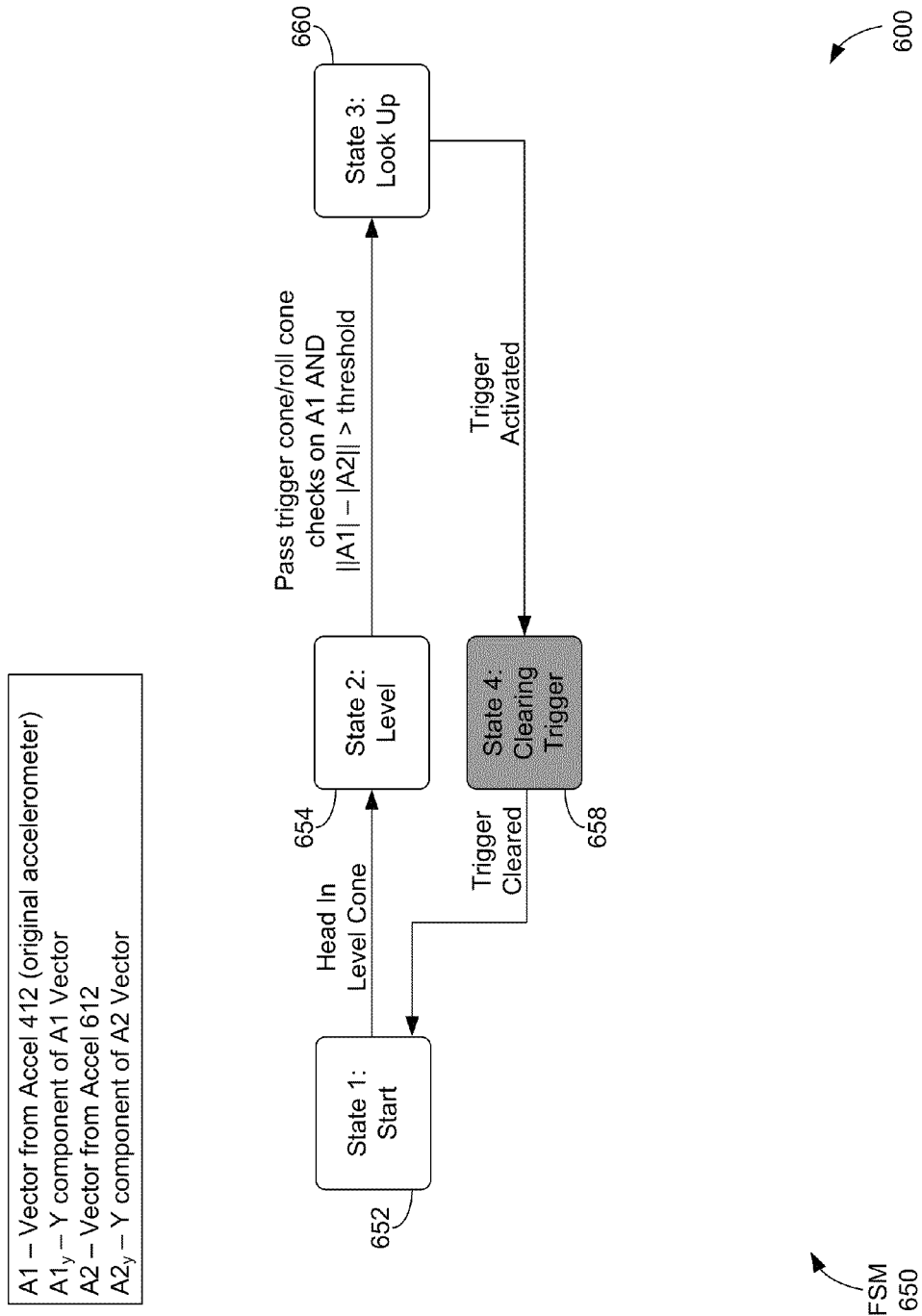
FIG. 6C shows an example FSM for recognizing a look up gesture using a WCD with two accelerometers, according to an example embodiment.

FIG. 6C shows FSM 650 for recognizing a look up gesture using a WCD with two accelerometers, such as accelerometers 412 and 612 shown in FIGS. 6A and 6B, which are always activated. In some embodiments, a computing device, such as WCD 610, can be configured to perform the tasks described herein as being performed by FSM 650.

FSM 650 can switch from start state 652 to level state 654 once the angle of the NLFPA is within a level cone, such as level cone 422 shown in FIGS. 4A and 4C, and discussed in more detail above in the context of FIGS. 4A and 4C.

In level state 654 shown in FIG. 6C, both accelerometers 412 and 612 continue to provide angle and acceleration data, represented as respective accelerometer vectors A1 and A2. While in level state 654, FSM 650 can use A1 to perform the trigger cone and roll cone tests discussed above in the context of FIGS. 4A, 4B, and 4C to see if an ALG is detected. FSM 650 can also test if the absolute difference of the magnitude of A1 and the magnitude of A2 exceeds a threshold value, such as the sensor threshold value or the epsilon (ϵ) value discussed above in the context of FIGS. 6A and 6B. If the absolute difference of the magnitude of A1 and the magnitude of A2 exceeds the threshold value, then FSM 650 has verified the ALG and so detected a look up gesture. After detecting the lookup gesture, FSM 650 can switch from level state 654 to look up state 656.

In look up state 656, FSM 650 can perform the activities described above as being performed in look up state 436 of FSM 430, discussed above at least in the context of FIG. 4C. If clearing trigger state 658 is used, FSM 650 can switch from look up state 656 to clearing trigger state 658 after gesture-recognition trigger activation and raising the gesture-recognition interrupt, as discussed above in the context of FIG. 4C. If clearing trigger state 658 is not used, FSM 650 can switch from look up state 656 to start state 652 after gesture-recognition trigger activation and raising the gesture-recognition interrupt, as discussed above in the context of FIG. 4C.

In optional clearing trigger state 658, FSM 650 can perform the activities described above as being performed in clearing trigger state 438 of FSM 430, discussed above at least in the context of FIG. 4C. FSM 650 can switch from clearing trigger state 658 to start state 652 after the gesture-recognition interrupt is cleared, as discussed above in the context of FIG. 4C.

Figure 6D:
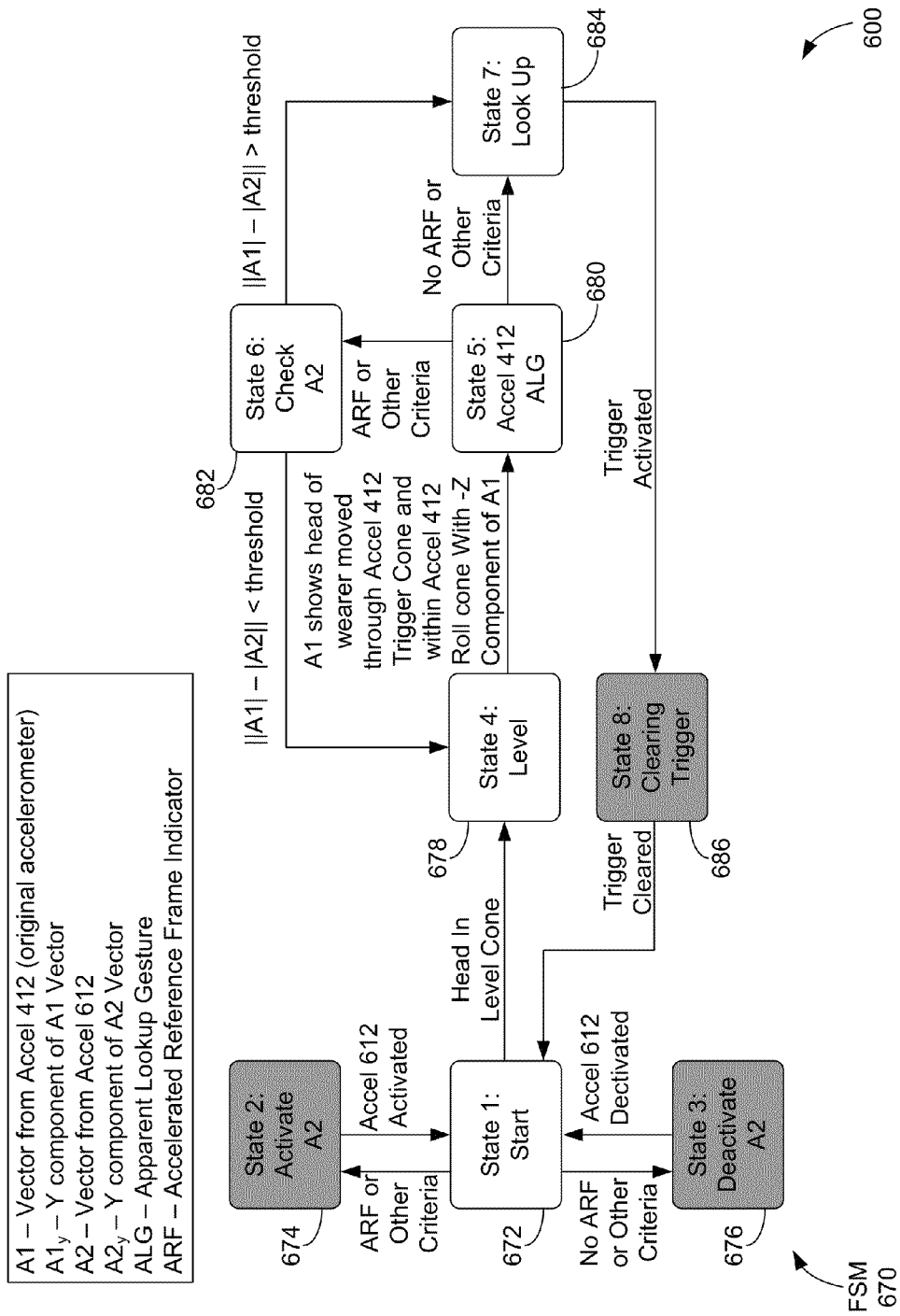
FIG. 6D shows another example FSM for recognizing a look up gesture using a WCD with two accelerometers, according to an example embodiment.

FIG. 6D shows another FSM 670 for recognizing a look up gesture using a WCD with two accelerometers, such as WCD 610. In some embodiments, a computing device, such as WCD 610, can be configured to perform the tasks described herein as being performed by FSM 670. In this embodiment, accelerometer 412 is always activated, while, in some cases, accelerometer 612 can be activated when needed and deactivated when not needed. Also, FSM 670 only checks data from accelerometer 612 as needed; e.g., only after accelerometer 412 has registered an apparent lookup gesture (ALG). In some cases, FSM 670 may utilize less power during operation than FSM 650.

An Accelerated Reference Frame (ARF) Indicator or other criteria can be tested during start state 672. Note that activating accelerometer 612 must be performed before an ALG is detected by accelerometer 412, lest no data be available from accelerometer 612 to verify or contradict the ALG. The ARF indicator can be set by various means and criteria. For example, WCD 610 can audio, video and/or other data to detect entry into/exit from a vehicle or other means for creating accelerated reference frames; e.g., amusement park equipment. As another example, wearer 616 can instruct WCD 610 that wearer 616 is entering into/exiting from an accelerated reference frame. Other possibilities are available for setting the ARF and/or establishing other criteria for activating/deactivating accelerometer 612 are possible as well, including but not limited to keeping accelerometer 612 active at all times.

If the test of the ARF or other criteria indicate that accelerometer 612 should be activated, FIG. 6D shows that FSM 670 can switch from start state 672 to activate accelerometer state 674 to activate accelerometer 612. Once accelerometer 612 is activated, FSM 670 can switch from activate accelerometer state 674 to start state 672. If the test of the ARF or other criteria indicate that accelerometer 612 should be deactivated, FIG. 6D shows that FSM 670 can switch from start state 672 to deactivate accelerometer state 676 to deactivate accelerometer 612. Once accelerometer 612 is deactivated, FSM 670 can switch from deactivate accelerometer state 676 to start state 672.

While in start state 672, accelerometer 412 provides angle and acceleration data, represented as accelerometer vector A1. FSM 670 can switch from start state 672 to level state 678 once a Y component of A1 is within a level cone, such as level cone 422 shown in FIGS. 4A and 4C, and discussed in more detail above in the context of FIGS. 4A and 4C.

In level state 678, accelerometer 412 continues to provide angle and acceleration data, represented as accelerometer vector A1. FSM 670 can wait for an angle between the +Y axis and A1 to exceed U degrees, and so to exit a trigger cone, such as trigger cone 426 discussed above in the context of level state 434 of FSM 430. FSM 670 can also verify that the X component of A1 is within R degrees of the X axis, and so remain within a roll cone, such as roll cone 428 discussed above in the context of level state 434 of FSM 430. Also in level state 678, the sign of the Z component of A1 can be tested to determine whether WCD 610 is tilting upwards, such as discussed above in the context of level state 434 of FSM 430. If WCD 610 is tilting upwards, the Z component of A1 as expressed in the device coordinate system is negative.

At accelerometer 412 ALG state 680, a determination is made as to whether accelerometer 612 will verify the ALG detected by accelerometer 412. For example, FSM 670 could check the ARF indicator to determine whether or not WCD 610 is in an accelerated frame of reference, and only use accelerometer 612 to verify the ALG when WCD 610 is in an accelerated frame of reference.

Then, if FSM 670 determines that accelerometer 612 is to verify the ALG, FSM 670 can switch from accelerometer 412

ALG state 680 to check A2 state 682. If FSM 670 determines that accelerometer 612 is not needed to verify the ALG, FSM 670 can switch from accelerometer 412 ALG state 680 to look up state 684.

In check A2 state 682 shown in FIG. 6D, both accelerometers 412 and 612 continue to provide angle and acceleration data, represented as respective accelerometer vectors A1 and A2. While check A2 state 682, FSM 670 tests if the absolute difference of the magnitude of A1 and the magnitude of A2 exceeds a threshold value, such as the sensor threshold value or the epsilon value discussed above in the context of FIGS. 6A and 6B. In some embodiments, FSM 670 can also test if the difference between the Y component of A1 and the Y component of A2 is greater than 0.

If the absolute difference of the magnitude of A1 and the magnitude of A2 exceeds a threshold value, then FSM 670 has verified the ALG and so can switch from check A2 state 682 to look up state 684. Otherwise, the absolute difference of the magnitude of A1 and the magnitude of A2 does not exceed the threshold value, and so the ALG is not verified. When the ALG is not verified, FSM 670 can switch from check A2 state 682 to level state 678.

In look up state 684, FSM 670 can perform the activities described above as being performed in look up state 436 of FSM 430, discussed above at least in the context of FIGS. 4C and 6C. If clearing trigger state 686 is used, FSM 670 can switch from look up state 684 to clearing trigger state 686 after gesture-recognition trigger activation and raising the gesture-recognition interrupt, as discussed above in the context of FIGS. 4C and 6C. If clearing trigger state 686 is not used, FSM 670 can switch from look up state 684 to start state 672 after gesture-recognition trigger activation and raising the gesture-recognition interrupt, as discussed above in the context of FIGS. 4C and 6C.

In optional clearing trigger state 686, FSM 670 can perform the activities described above as being performed in clearing trigger state 438 of FSM 430, discussed above at least in the context of FIGS. 4C and 6C. FSM 670 can switch from clearing trigger state 686 to start state 672 after the gesture-recognition interrupt is cleared, as discussed above in the context of FIGS. 4C and 6C.

Figure 7A:
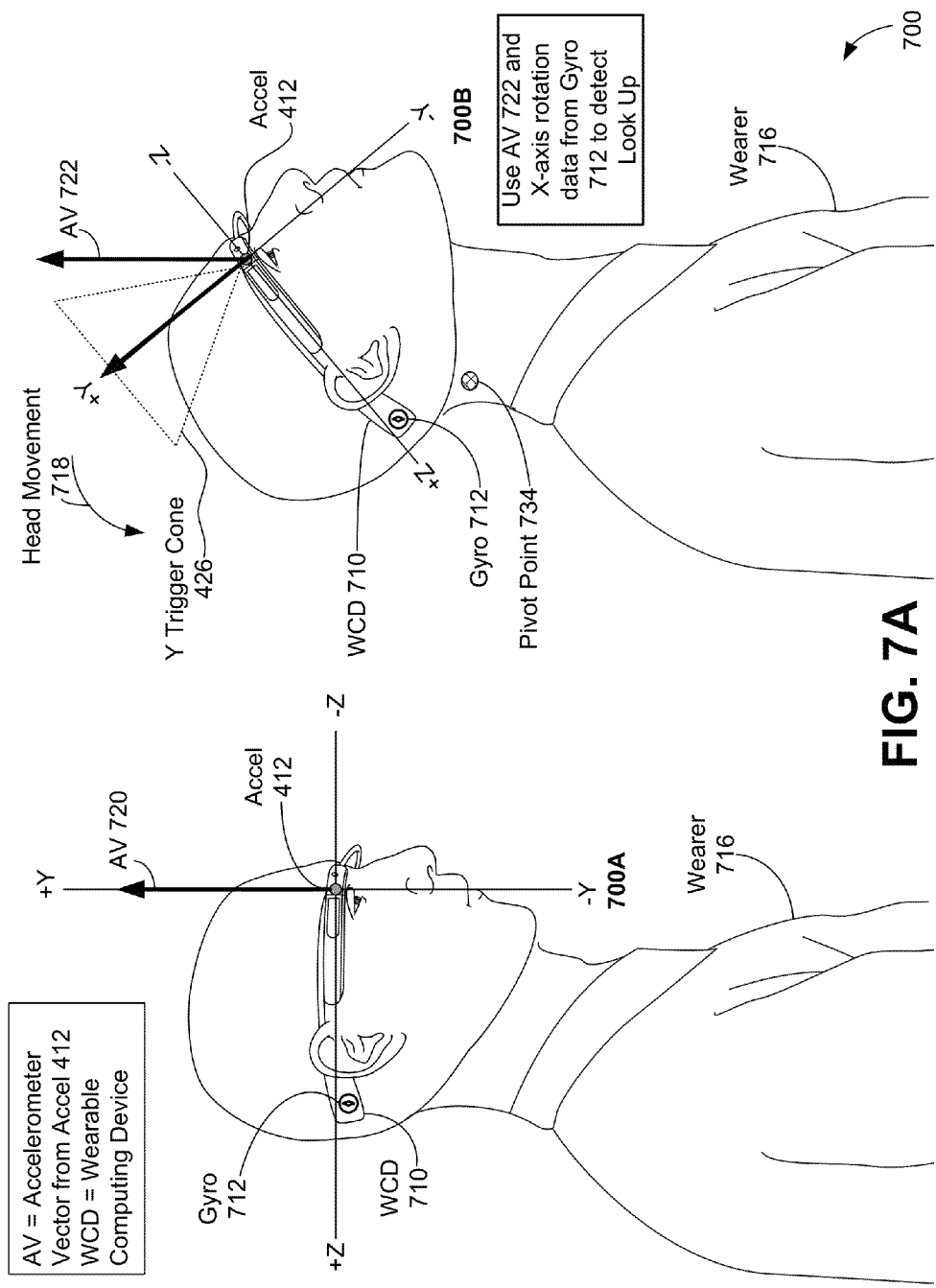
FIGS. 7A and 7B show an example scenario where a wearer wears a WCD configured with an accelerometer and a gyroscope, tilts his/her head up, and then wears the WCD in an accelerated reference frame, according to an example embodiment.
Figure 7B:
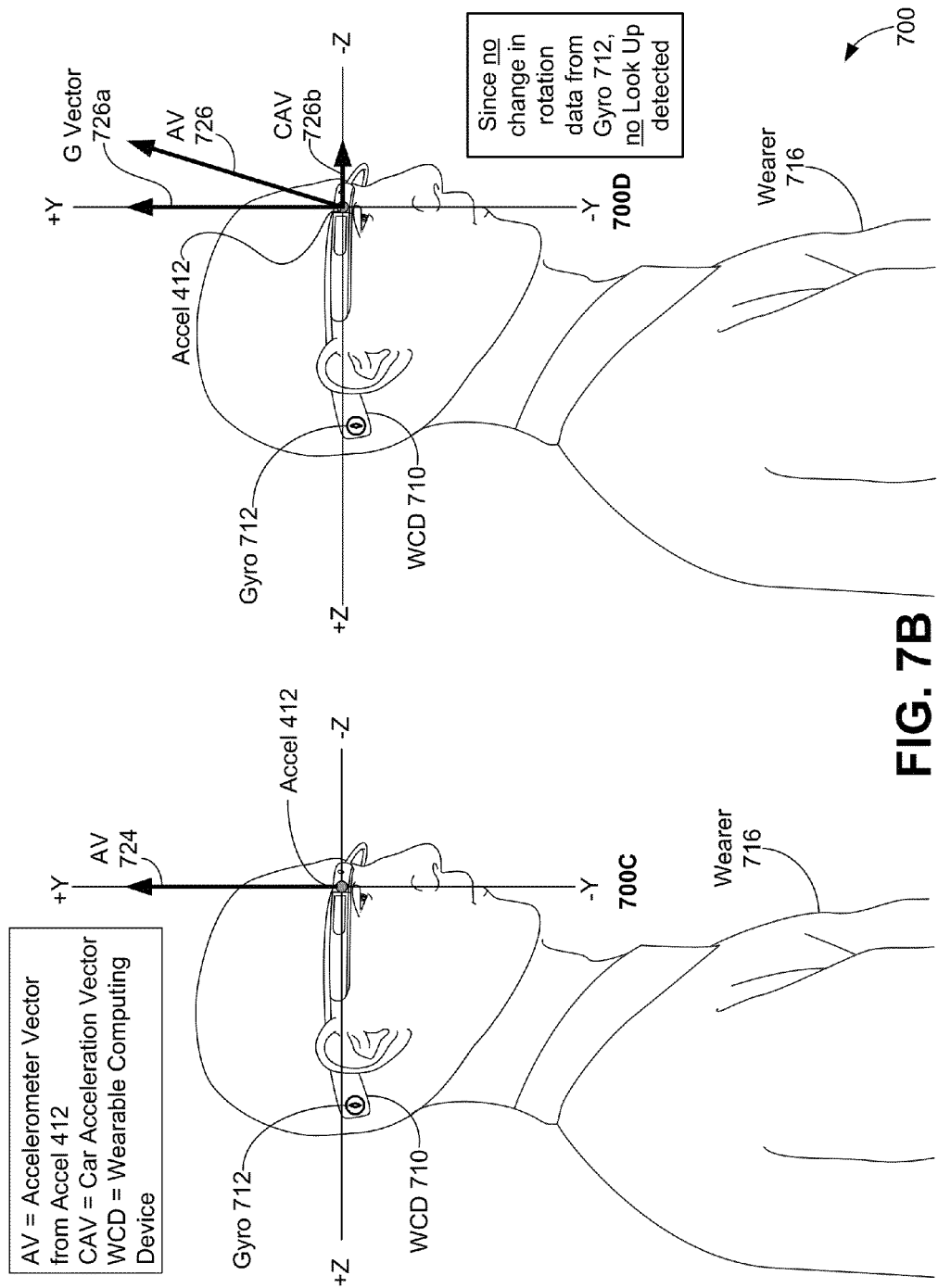

In other embodiments, an accelerometer and a gyroscope can be used to detect and verify look up gestures in accelerated reference frames and non-accelerated reference frames. FIGS. 7A and 7B show scenario 700, where wearer 716 wears WCD 710, tilts his/her head up, and then wears WCD 710 in an accelerated reference frame, where WCD 710 is configured with accelerometer 412 and gyroscope 712.

As shown in FIG. 7A, scenario 700 begins at 700A with wearer 716 wearing HMD 710 in a level position in an unaccelerated reference frame; for example, wearer 716 can be standing or sitting still. HMD 710 is equipped with sensors that include at least accelerometer 412 and gyroscope 712. While in operation, accelerometer 412 generates acceleration data that when normalized and screened for acceptable data as discussed above in the contexts of FIGS. 4A and 4C, leads to representation as an acceleration vector, termed AV during scenario 700 and as shown in FIGS. 7A and 7B. While in operation, gyroscope 712 generates rotational data about at least the X axis of the device coordinate system. As discussed above, the X axis comes out of the plane of FIGS. 7A and 7B.

While at rest in an unaccelerated reference frame, AV 720 from accelerometer 412 is upward in response to the Earth's gravity and rotational data about the X axis from gyroscope 712 can indicate that a head of wearer 716 is not rotating.

Scenario 700 continues at 700B with wearer 716 tilting his/her head up to perform a look up gesture. During scenario 700, the head of wearer 716 is assumed to move around a pivot point, indicated as pivot point 734, to perform the look up gesture. As shown in FIG. 7A, AV 722 represents accelerometer data from accelerometer 412, which detects the angle and magnitude of acceleration due to movement of the head of wearer 716. At 700B, gyroscope 712 generates rotation data that indicates a change in angle around the X axis. In scenario 700, a change in angle around the X axis is due to movement of the head of wearer 716.

To determine if a look up gesture has taken place, WCD 710 can perform the level cone, roll cone, and Y trigger cone tests on AV 722 as discussed in the context of FIGS. 4A, 4B, and 4C. Then, if these tests indicate that wearer 716 has performed an apparent look up gesture, WCD 710 can verify the apparent look up gesture by determining whether a change in angle about the X axis occurred using the rotation data generated by gyroscope 712. If the change in angle about the X axis occurred, then the head of wearer 716 likely has rotated and so the apparent look up gesture is verified. However, if gyroscope 712 did not detect a change in angle about the X axis, then the head of wearer 716 likely has not rotated and so the apparent look up gesture is not verified.

In scenario 700, wearer 716 performed a look up gesture at 700B, which is detected by accelerometer 412 and verified by gyroscope 712. Scenario 700 continues with wearer 716 looking down to return his/her head to level upon entering a car and sitting at rest, as shown in FIG. 7B at 700C. Scenario 700 continues at 700D where the car carrying wearer 716 accelerates forward.

As such, at 700D, wearer 716 has entered into an accelerated frame of reference. FIG. 7B shows that at 700D, accelerometer 412 measure a net accelerometer vector AV 726 that is a resultant of an upward gravity-responsive vector, shown in FIG. 7B as G vector 726*a*, and a forward acceleration due to the accelerating car, shown as CAV 726*b*.

In scenario 700, the head of wearer 716 did not rotate with respect to the X axis while the car carrying wearer 716 accelerated forward. As such, gyroscope 712 generates rotation data indicating little or no rotation about the X axis. That means that, even AV 726 appears to indicate a look up gesture, the rotation data from gyroscope 712 indicates that the head of wearer 716 did not rotate, and so the apparent look up gesture detection is a false positive.

FSM 430, discussed above for use with WCD 410, can be modified for use with a WCD that has an accelerometer and a gyroscope, such as WCD 710, where the WCD can detect look up gestures accurately in both accelerated frames of reference and unaccelerated frames of reference.

Figure 7C:
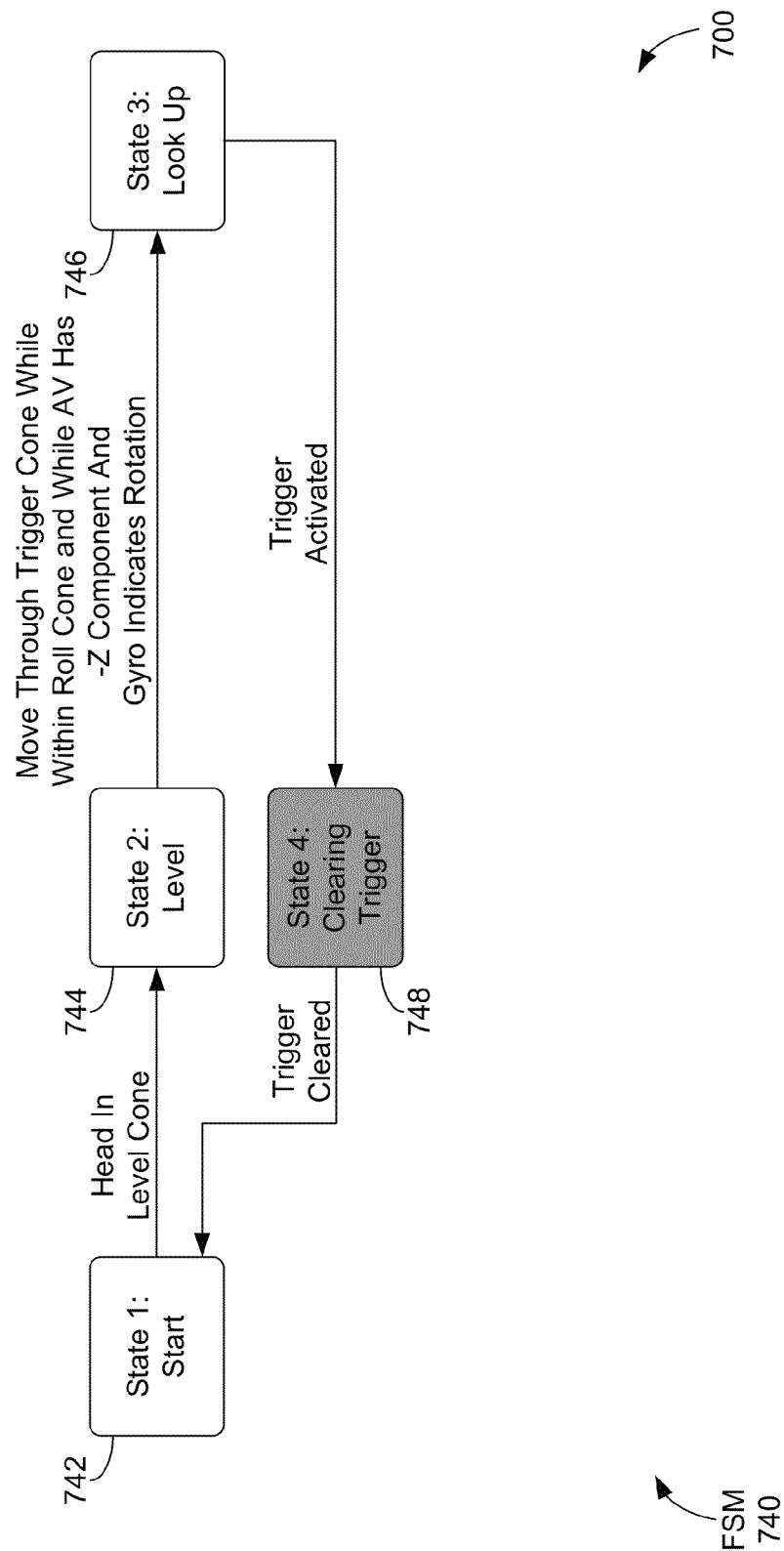
FIG. 7C shows an example FSM for recognizing a look up gesture using a WCD with an accelerometer and a gyroscope, according to an example embodiment.

FIG. 7C shows FSM 740 for recognizing a look up gesture using a WCD with an accelerometer and a gyroscope, such as WCD 710. In some embodiments, a computing device, such as WCD 710, can be configured to perform the tasks described herein as being performed by FSM 740.

FSM 740 can switch from start state 742 to level state 744 once the angle of the acceleration vector generated by accelerometer 412 is within a level cone, such as level cone 422 shown in FIGS. 4A and 4C, and discussed in more detail above in the context of at least FIGS. 4A, 4C, and 6C.

In level state 744 shown in FIG. 7C, accelerometer 412 continues to provide angle and acceleration data, represented as accelerometer vector AV. FSM 740 can wait for an angle between the +Y axis and AV to exceed U degrees, and so to exit a trigger cone, such as trigger cone 426 discussed above in the context of level state 434 of FSM 430. FSM 740 can also verify that the X component of AV is within R degrees of the X axis, and so remain within a roll cone, such as roll cone 428 discussed above in the context of level state 434 of FSM 430. Also in level state 744, the sign of the Z component of AV can be tested to determine whether WCD 710 is tilting upwards, such as discussed above in the context of level state 434 of FSM 430. If WCD 710 is tilting upwards, the Z component of AV as expressed in the device coordinate system is negative.

Also, rotation data from gyroscope 712 can be checked to see if the head of wearer 716 has rotated about the X axis. If AV has gone outside of the trigger cone and has −Z component WCD 710 is tilting upwards, and the rotation data from gyroscope 712 indicates that the head of wearer 716 has rotated about the X axis, FSM 740 has detected a look up gesture and so can switch from level state 744 to look up state 746.

In look up state 746, FSM 740 can perform the activities described above as being performed in look up state 436 of FSM 430 and/or look up state 656 of FSM 650, discussed above at least in the context of FIGS. 4C and 6C. If clearing trigger state 748 is used, FSM 740 can switch from look up state 746 to clearing trigger state 748 after gesture-recognition trigger activation and raising the gesture-recognition interrupt, as discussed above at least in the context of FIGS. 4C and 6C. If clearing trigger state 748 is not used, FSM 740 can switch from look up state 746 to start state 742 after gesture-recognition trigger activation and raising the gesture-recognition interrupt, as discussed above at least in the context of FIGS. 4C and 6C.

In optional clearing trigger state 748, FSM 740 can perform the activities described above as being performed in clearing trigger state 438 of FSM 430 and/or clearing trigger state 658 of FSM 650, discussed above at least in the context of FIGS. 4C and 6C. FSM 740 can switch from clearing trigger state 748 to start state 742 after the gesture-recognition interrupt is cleared, as discussed above at least in the context of FIGS. 4C and 6C.

Figure 7D:
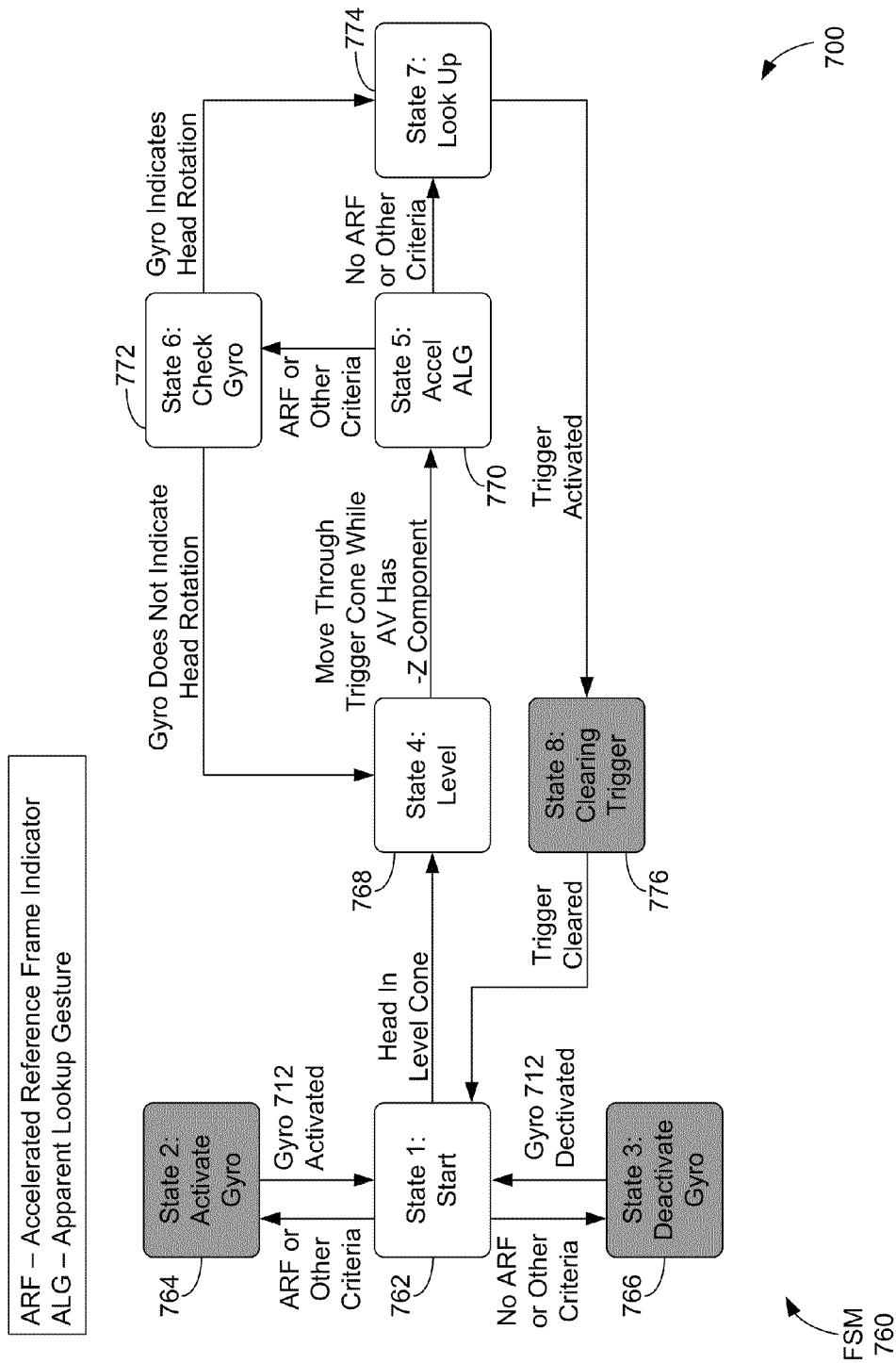
FIG. 7D shows another example FSM for recognizing a look up gesture using a WCD with an accelerometer and a gyroscope, according to an example embodiment.

FIG. 7D shows another FSM 760 for recognizing a look up gesture using a WCD with an accelerometer and a gyroscope, such as WCD 710. In some embodiments, a computing device, such as WCD 710, can be configured to perform the tasks described herein as being performed by FSM 760. FSM 760 only checks gyroscope 712 when needed; e.g., only after accelerometer 412 has registered an apparent lookup gesture (ALG). In some cases, FSM 760 may utilize less power during operation than FSM 740.

The ARF Indicator or other criteria can be tested during start state 762. Note that activating gyroscope 712 must be performed before an ALG is detected by accelerometer 412, lest no data be available from gyroscope 712 to verify or contradict the ALG. The ARF indicator can be set by various means and criteria, such as discussed above in the context of WCD 610 and at least FIG. 6D. Other possibilities are available for setting the ARF and/or establishing other criteria for activating/deactivating gyroscope 712 are possible as well, including but not limited to keeping gyroscope 712 active at all times.

If the test of the ARF or other criteria indicate that gyroscope 712 should be activated, FIG. 7D shows that FSM 760 can switch from start state 762 to activate gyroscope state 764 to activate gyroscope 712. Once gyroscope 712 is activated, FSM 760 can switch from activate gyroscope state 764 to start state 762. If the test of the ARF or other criteria indicate that gyroscope 712 should be deactivated, FIG. 7D shows that FSM 760 can switch from start state 762 to deactivate gyroscope state 766 to deactivate gyroscope 712. Once gyroscope 712 is deactivated, FSM 760 can switch from deactivate gyroscope state 766 to start state 762.

While in start state 762, accelerometer 412 provides angle and acceleration data, represented as accelerometer vector AV. FSM 760 can switch from start state 762 to level state 768 once a Y component of accelerometer vector AV is within a level cone, such as level cone 422 shown in FIGS. 4A and 4C, and discussed in more detail above in the context of FIGS. 4A and 4C.

In level state 768, accelerometer 412 continues to provide angle and acceleration data, represented as accelerometer vector AV. FSM 760 can wait for an angle between the +Y axis and AV to exceed U degrees, and so to exit a trigger cone, such as trigger cone 426 discussed above in the context of level state 434 of FSM 430. FSM 760 can also verify that the X component of AV is within R degrees of the X axis, and so remain within a roll cone, such as roll cone 428 discussed above in the context of level state 434 of FSM 430. Also in level state 768, the sign of the Z component of AV can be tested to determine whether WCD 710 is tilting upwards, such as discussed above in the context of level state 434 of FSM 430. If WCD 710 is tilting upwards, the Z component of AV as expressed in the device coordinate system is negative.

At accelerometer ALG state 770, a determination is made as to whether gyroscope 712 will verify the ALG detected by accelerometer 412. For example, FSM 760 could check the ARF indicator to determine whether or not WCD 710 is in an accelerated frame of reference, and only use gyroscope 712 to verify the ALG when WCD 710 is in an accelerated frame of reference.

Then, if FSM 760 determines that gyroscope 712 is to verify the ALG, FSM 760 can switch from accelerometer ALG state 770 to check gyro state 772. If FSM 760 determines that gyroscope 712 is not needed to verify the ALG, FSM 760 can switch from accelerometer ALG state 770 to look up state 774.

In check gyro state 772 shown in FIG. 7D, gyroscope 712 generates rotation data. FSM 760 can check the rotation data to determine if the rotation data indicates a change in angle around the X axis, inferring that a change in angle in the X axis is due to movement of the head of wearer 716. If the rotation data indicates a change in angle about the X axis occurred, then the head of wearer 716 likely has rotated, the apparent look up gesture has been verified, and FSM 760 can switch from check gyro state 772 to look up state 774.

However, if gyroscope 712 did not detect a change in angle about the X axis, then the head of wearer 716 likely has not rotated, the apparent look up gesture is not verified, and FSM 760 can switch from check gyro state 772 to level state 768.

In look up state 774, FSM 760 can perform the activities described above as being performed in look up state 436 of FSM 430, discussed above at least in the context of FIGS. 4C, 6C and 7C. If clearing trigger state 776 is used, FSM 760 can switch from look up state 774 to clearing trigger state 776 after gesture-recognition trigger activation and raising the gesture-recognition interrupt, as discussed above in the context of FIGS. 4C, 6C, and 7C. If clearing trigger state 776 is not used, FSM 760 can switch from look up state 774 to start state 762 after gesture-recognition trigger activation and raising the gesture-recognition interrupt, as discussed above in the context of FIGS. 4C, 6C, and 7C.

In optional clearing trigger state 776, FSM 760 can perform the activities described above as being performed in clearing trigger state 438 of FSM 430, discussed above at least in the context of FIGS. 4C and 6C. FSM 760 can switch from clearing trigger state 776 to start state 762 after the gesture-recognition interrupt is cleared, as discussed above in the context of FIGS. 4C, 6C, and 7C.

In other embodiments, an accelerometer and a magnetometer can be used to detect and verify look up gestures in accelerated reference frames and non-accelerated reference frames. A 3 axis magnetometer gives the direction of magnetic field in X, Y, and Z coordinates and is unaffected by acceleration.

Figure 8A:
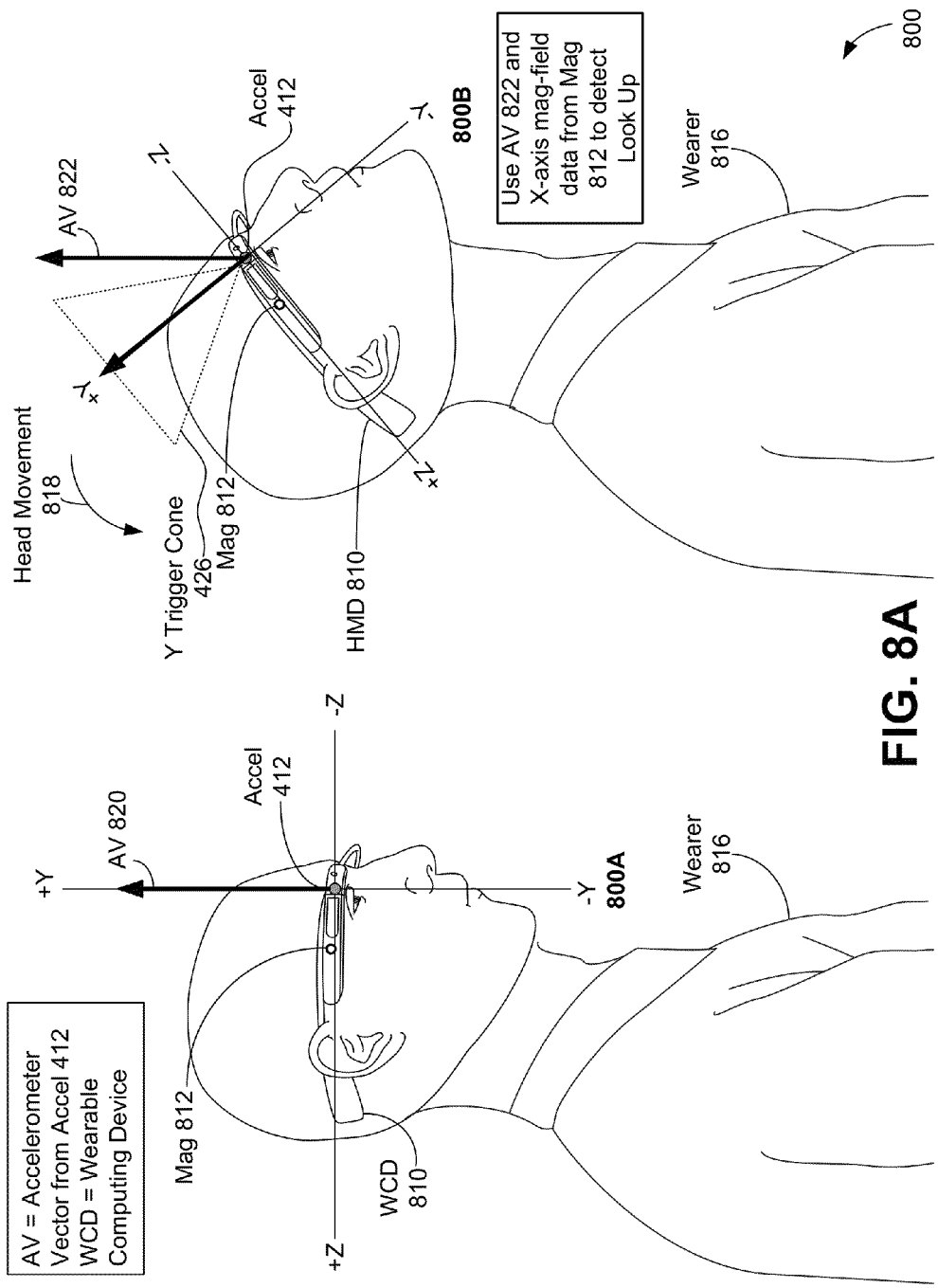
FIGS. 8A and 8B show an example scenario where a wearer wears a WCD configured with an accelerometer and a magnetometer, tilts his/her head up, and then wears the WCD in an accelerated reference frame, according to an example embodiment.

FIG. 8A shows WCD 810 configured with a 3-axis magnetometer 812 and accelerometer 412, where the axes of magnetometer 812 are aligned with the axes of accelerometer 412. When the head of wearer 816 tilts up, magnetometer 812 can detect a change in the angle of the magnetic field similar to the change in the angle of the acceleration due to gravity. That is, in the look-up case, magnetic-field data from magnetometer 812 corresponds to acceleration data from accelerometer 412. However, in the case that wearer 816 is in an accelerating frame of reference, such as an accelerating car discussed above in the context of FIG. 5, acceleration data from accelerometer 412 will indicate acceleration but magnetic-field data from magnetometer 812 will not confirm the acceleration.

Figure 8B:
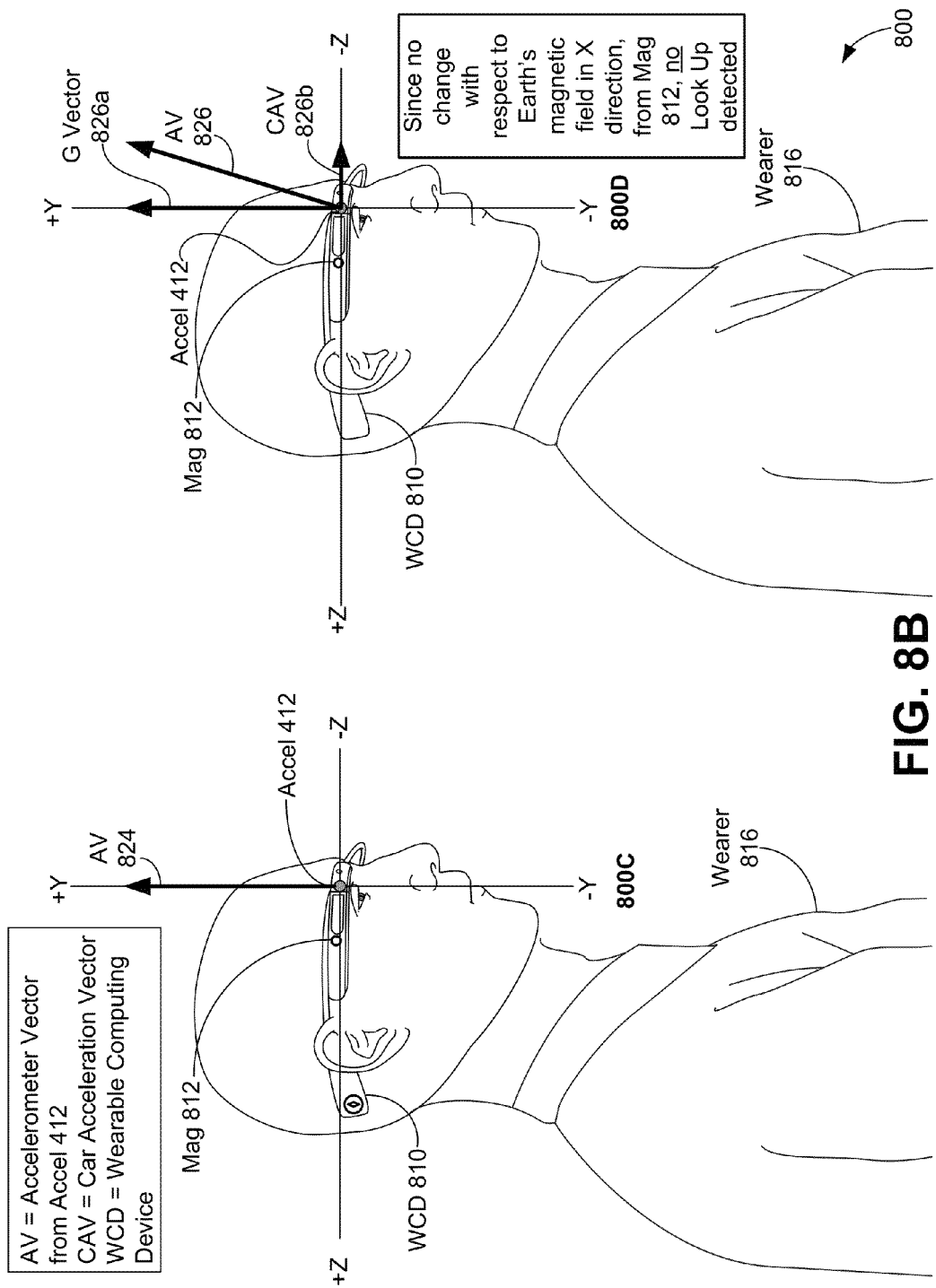

FIGS. 8A and 8B show scenario 800, where wearer 816 wears WCD 810, tilts his/her head up, and then wears WCD 810 in an accelerated reference frame, where WCD 810 is configured with accelerometer 412 and magnetometer 812.

As shown in FIG. 8A, scenario 800 begins at 800A with wearer 816 wearing HMD 810 in a level position in an unaccelerated reference frame; for example, wearer 816 can be standing or sitting still. As mentioned above, HMD 810 is equipped with sensors that include at least accelerometer 412 and magnetometer 812. While in operation, accelerometer 412 generates acceleration data that when normalized and screened for acceptable data as discussed above in the contexts of FIGS. 4A and 4C, leads to representation as an acceleration vector, termed AV during scenario 800 and as shown in FIGS. 8A and 8B. While in operation, magnetometer 812 generates magnetic-field data about at least the X axis of the device coordinate system. As discussed above, the X axis comes out of the plane of FIGS. 8A and 8B.

While at rest in an unaccelerated reference frame, AV 820 from accelerometer 412 is upward in response to the Earth's gravity and magnetic-field data about the X axis from magnetometer 812 can indicate that a head of wearer 816 is not rotating.

Scenario 800 continues at 800B with wearer 816 tilting his/her head up to perform a look up gesture. As shown in FIG. 8A, AV 822 represents accelerometer data from accelerometer 412, which detects the angle and magnitude of acceleration due to movement of the head of wearer 816. At 800B, magnetometer 812 generates magnetic-field data that indicates a change in angle of the Earth's magnetic field around the X axis. In scenario 800, a change in angle around the X axis is due to movement of the head of wearer 816.

To determine if a look up gesture has taken place, WCD 810 can perform the level cone, roll cone, and Y trigger cone tests on AV 822 as discussed in the context of FIGS. 4A, 4B, and 4C. Then, if these tests indicate that wearer 816 has performed an apparent look up gesture, WCD 810 can verify the apparent look up gesture by determining whether a change in angle about the X axis occurred using the magnetic-field data generated by magnetometer 812. If the change in angle about the X axis occurred, then the head of wearer 816 likely has rotated and so the apparent look up gesture is verified. However, if magnetometer 812 did not detect a change in angle about the X axis, then the head of wearer 816 likely has not rotated and so the apparent look up gesture is not verified.

In scenario 800, wearer 816 performed a look up gesture at 800B, which is detected by accelerometer 412 and verified by magnetometer 812. Scenario 800 continues with wearer 816 looking down to return his/her head to level upon entering a car and sitting at rest, as shown in FIG. 8B at 800C. Scenario 800 continues at 800D where the car carrying wearer 816 accelerates forward.

As such, at 800D, wearer 816 has entered into an accelerated frame of reference. FIG. 8B shows that at 800D, accelerometer 412 measure a net accelerometer vector AV 826 that is a resultant of an upward gravity-responsive vector, shown in FIG. 8B as G vector 826a, and a forward acceleration due to the accelerating car, shown as CAV 826b.

In scenario 800, the head of wearer 816 did not move about the X axis while the car carrying wearer 816 accelerated forward. As such, magnetometer 812 generates magnetic-field data indicating little or no movement with respect to the Earth's magnetic field about the X axis. That means that, even AV 826 appears to indicate a look up gesture, the magnetic-field data from magnetometer 812 indicates that the head of wearer 816 did not rotate, and so the apparent look up gesture detection is a false positive.

FSM 430, discussed above for use with WCD 410, can be modified for use with a WCD that has an accelerometer and a magnetometer, such as WCD 810, where the WCD can detect look up gestures accurately in both accelerated frames of reference and unaccelerated frames of reference.

Figure 8C:
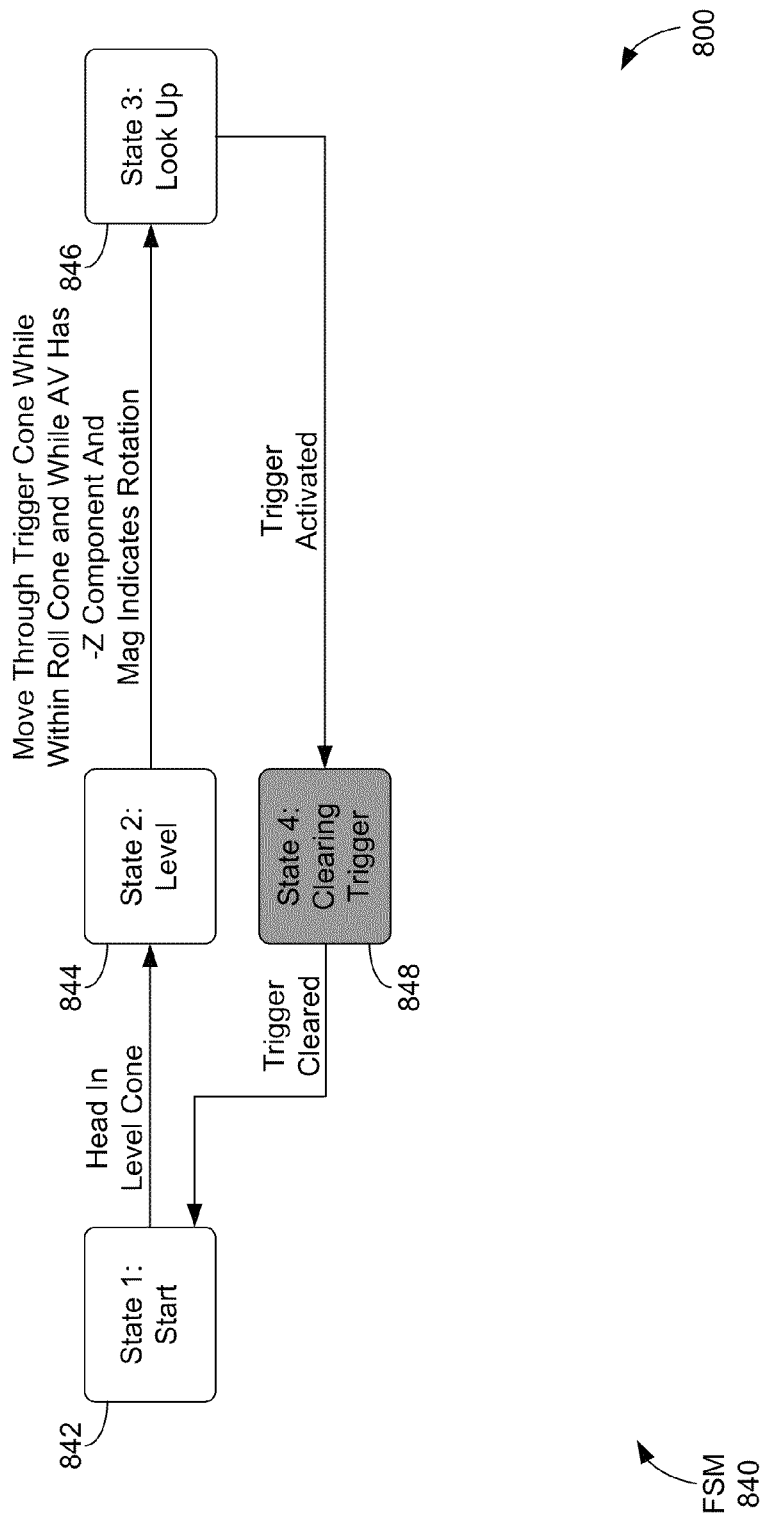
FIG. 8C shows an example FSM for recognizing a look up gesture using a WCD with an accelerometer and a magnetometer, according to an example embodiment.

FIG. 8C shows FSM 840 for recognizing a look up gesture using a WCD with an accelerometer and a magnetometer, such as WCD 810. In some embodiments, a computing device, such as WCD 810, can be configured to perform the tasks described herein as being performed by FSM 840.

FSM 840 can switch from start state 842 to level state 844 once the angle of the acceleration vector generated by accelerometer 412 is within a level cone, such as level cone 422 shown in FIGS. 4A and 4C, and discussed in more detail above in the context of at least FIGS. 4A, 4C, 6C, and 7C.

In level state 844 shown in FIG. 8C, accelerometer 412 continues to provide angle and acceleration data, represented as accelerometer vector AV. FSM 840 can wait for an angle between the +Y axis and AV to exceed U degrees, and so to exit a trigger cone, such as trigger cone 426 discussed above in the context of level state 434 of FSM 430. FSM 840 can also verify that the X component of AV is within R degrees of the Y axis, and so remain within a roll cone, such as roll cone 428 discussed above in the context of level state 434 of FSM 430. Also in level state 844, the sign of the Z component of AV can be tested to determine whether WCD 810 is tilting upwards, such as discussed above in the context of level state 434 of FSM 430. If WCD 810 is tilting upwards, the Z component of AV as expressed in the device coordinate system is negative.

Also, magnetic-field data from magnetometer 812 can be checked to see if the head of wearer 816 has rotated about the X axis, as discussed above in the context of FIGS. 8A and 8B. If AV has gone outside of the trigger cone and has –Z component WCD 810 is tilting upwards, and the magnetic-field data from magnetometer 812 indicates that the head of wearer 816 has rotated about the X axis, FSM 840 has detected a look up gesture and so can switch from level state 844 to look up state 846.

In look up state 846, FSM 840 can perform the activities described above as being performed in look up state 436 of FSM 430, look up state 656 of FSM 650, and/or look up state 746 of FSM 740, discussed above at least in the context of FIGS. 4C, 6C, and 7C. If clearing trigger state 848 is used, FSM 840 can switch from look up state 846 to clearing trigger state 848 after gesture-recognition trigger activation and raising the gesture-recognition interrupt, as discussed above at least in the context of FIGS. 4C, 6C, and 7C. If clearing trigger state 848 is not used, FSM 840 can switch from look up state 846 to start state 842 after gesture-recognition trigger activation and raising the gesture-recognition interrupt, as discussed above at least in the context of FIGS. 4C, 6C, and 7C.

In optional clearing trigger state 848, FSM 840 can perform the activities described above as being performed in clearing trigger state 438 of FSM 430, clearing trigger state 658 of FSM 650, and/or clearing trigger state 748 of FSM 740, discussed above at least in the context of FIGS. 4C, 6C, and 7C. FSM 840 can switch from clearing trigger state 848 to start state 842 after the gesture-recognition interrupt is cleared, as discussed above at least in the context of FIGS. 4C, 6C, and 7C.

Figure 8D:
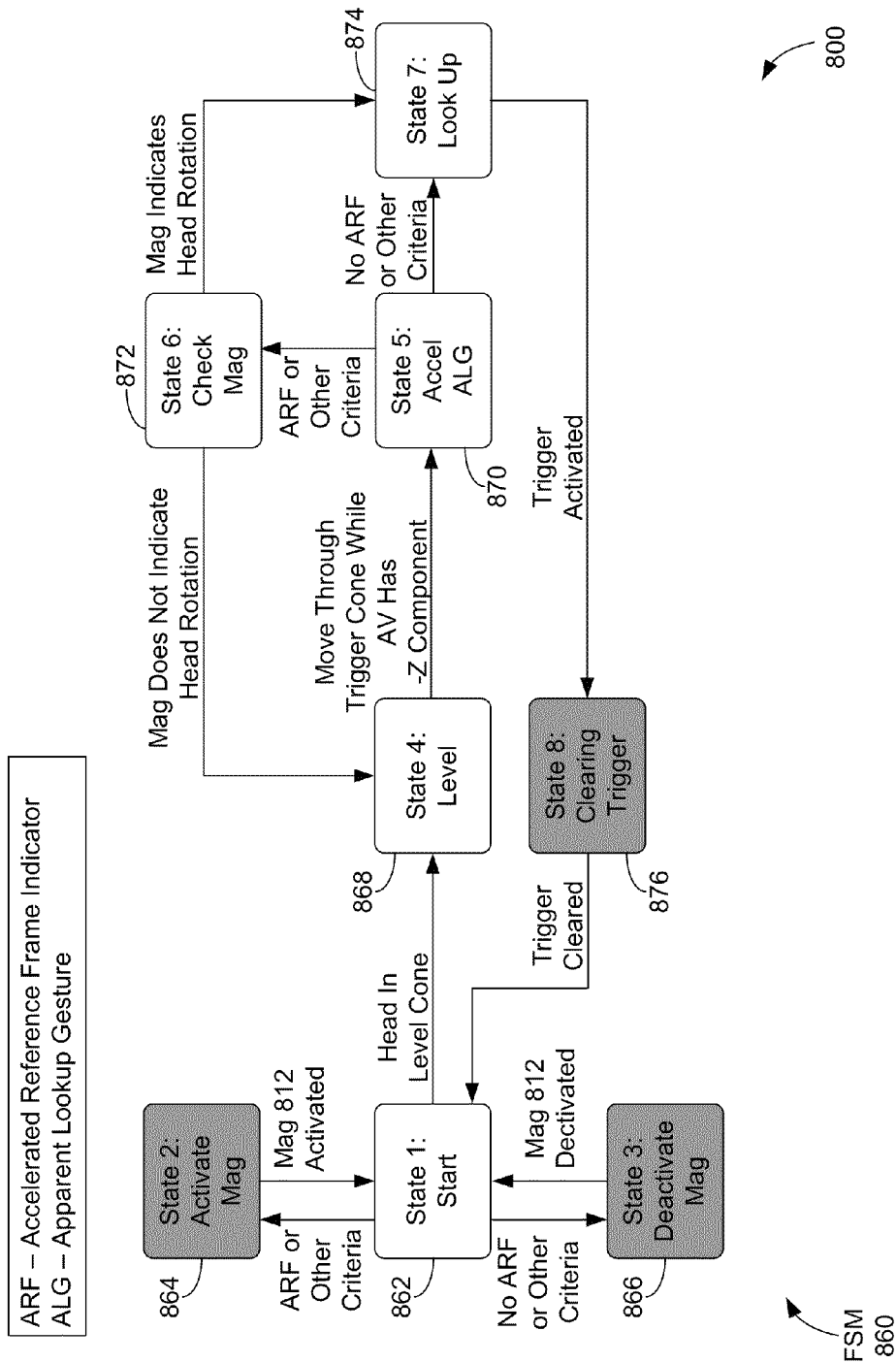
FIG. 8D shows another example FSM for recognizing a look up gesture using a WCD with an accelerometer and a magnetometer, according to an example embodiment.

FIG. 8D shows another FSM 860 for recognizing a look up gesture using a WCD with an accelerometer and a magnetometer, such as WCD 810. In some embodiments, a computing device, such as WCD 810, can be configured to perform the tasks described herein as being performed by FSM 860. FSM 860 only checks magnetometer 812 when needed; e.g., only after accelerometer 412 has registered an apparent lookup gesture (ALG). In some cases, FSM 860 may utilize less power during operation than FSM 840.

The ARF Indicator or other criteria can be tested during start state 862. Note that activating magnetometer 812 must be performed before an ALG is detected by accelerometer 412, lest no data be available from magnetometer 812 to verify or contradict the ALG. The ARF indicator can be set by various means and criteria, such as discussed above in the context of WCD 610 and at least FIG. 6D. Other possibilities are available for setting the ARF and/or establishing other criteria for activating/deactivating magnetometer 812 are possible as well, including but not limited to keeping magnetometer 812 active at all times.

If the test of the ARF or other criteria indicate that magnetometer 812 should be activated, FIG. 8D shows that FSM 860 can switch from start state 862 to activate magnetometer state 864 to activate magnetometer 812. Once magnetometer 812 is activated, FSM 860 can switch from activate magnetometer state 864 to start state 862. If the test of the ARF or other criteria indicate that magnetometer 812 should be deactivated, FIG. 8D shows that FSM 860 can switch from start state 862 to deactivate magnetometer state 866 to deactivate magnetometer 812. Once magnetometer 812 is deactivated, FSM 860 can switch from deactivate magnetometer state 866 to start state 862.

While in start state 862, accelerometer 412 provides angle and acceleration data, represented as accelerometer vector AV. FSM 860 can switch from start state 862 to level state 868 once a Y component of accelerometer vector AV is within a level cone, such as level cone 422 shown in FIGS. 4A and 4C, and discussed in more detail above in the context of FIGS. 4A and 4C.

In level state 868, accelerometer 412 continues to provide angle and acceleration data, represented as accelerometer vector AV. FSM 860 can wait for an angle between the +Y axis and AV to exceed U degrees, and so to exit a trigger cone, such as trigger cone 426 discussed above in the context of level state 434 of FSM 430. FSM 860 can also verify that the X component of AV is within R degrees of the Y axis, and so remains within a roll cone, such as roll cone 428 discussed above in the context of level state 434 of FSM 430. Also in level state 868, the sign of the Z component of AV can be tested to determine whether WCD 810 is tilting upwards, such as discussed above in the context of level state 434 of FSM 430. If WCD 810 is tilting upwards, the Z component of AV as expressed in the device coordinate system is negative.

At accelerometer ALG state 870, a determination is made as to whether magnetometer 812 will verify the ALG detected by accelerometer 412. For example, FSM 860 could check the ARF indicator to determine whether or not WCD 810 is in an accelerated frame of reference, and only use magnetometer 812 to verify the ALG when WCD 810 is in an accelerated frame of reference.

Then, if FSM 860 determines that magnetometer 812 is to verify the ALG, FSM 860 can switch from accelerometer ALG state 870 to check mag state 872. If FSM 860 determines that magnetometer 812 is not needed to verify the ALG, FSM 860 can switch from accelerometer ALG state 870 to look up state 874.

In check mag state 872 shown in FIG. 8D, magnetometer 812 generates magnetic-field data. FSM 860 can check the magnetic-field data to determine if the magnetic-field data indicates a change in angle with respect to the Earth's magnetic field around the X axis, inferring that such a change in angle about the X axis is due to movement of the head of wearer 816. If the magnetic-field data indicates a change in angle about the X axis occurred, then the head of wearer 816 likely has rotated, the apparent look up gesture has been verified, and FSM 860 can switch from check mag state 872 to look up state 874.

However, if magnetometer 812 did not detect a change in angle about the X axis, then the head of wearer 816 likely has not rotated, the apparent look up gesture is not verified, and FSM 860 can switch from check mag state 872 to level state 868.

In look up state 874, FSM 860 can perform the activities described above as being performed in look up state 436 of FSM 430, discussed above at least in the context of FIGS. 4C, 6C and 7C. If clearing trigger state 876 is used, FSM 860 can switch from look up state 874 to clearing trigger state 876 after gesture-recognition trigger activation and raising the gesture-recognition interrupt, as discussed above in the context of FIGS. 4C, 6C, and 7C. If clearing trigger state 876 is not used, FSM 860 can switch from look up state 874 to start state 862 after gesture-recognition trigger activation and raising the gesture-recognition interrupt, as discussed above in the context of FIGS. 4C, 6C, and 7C.

In optional clearing trigger state 876, FSM 860 can perform the activities described above as being performed in clearing trigger state 438 of FSM 430, discussed above at least in the context of 4C, 6C, and 7C. FSM 860 can switch from clearing trigger state 876 to start state 862 after the gesture-recognition interrupt is cleared, as discussed above in the context of FIGS. 4C, 6C, and 7C.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method, comprising
receiving level-indication data at a wearable computing device (WCD) from at least an accelerometer, wherein the WCD is worn by a wearer;
determining whether a head of the wearer is level relative to gravity based on the level-indication data using the WCD, wherein determining whether the head of the wearer is level comprises comparing a magnitude of the level-indication data to a minimum magnitude threshold and a maximum magnitude threshold; and
in response to determining that the head of the wearer is level, the WCD:
receiving lookup-indication data from at least the accelerometer,
determining whether the head of the wearer is tilted up relative to gravity based on the lookup-indication data, and
in response to determining that the head of the wearer is tilted up,
generating a gesture-recognition trigger, wherein the gesture-recognition trigger indicates that the head of the wearer has moved up from level.

2. The method of claim 1, wherein determining whether the head of the wearer is level comprises:
determining whether the magnitude of the level-indication data is greater than the maximum magnitude threshold;
in response to determining that the magnitude of the level-indication data is greater than the maximum magnitude threshold, determining that the head of the wearer is not level; and
in response to determining that the magnitude of the level-indication data is less than the minimum magnitude threshold, determining that the head of the wearer is not level.

3. The method of claim 1, wherein determining whether the head of the wearer is level comprises:
defining an X-axis, a Y-axis, and a Z-axis for the accelerometer;
determining an accelerometer vector based on the level-indication data, the accelerometer vector comprising an X component along the X-axis, a Y component along the Y-axis, and a Z component along the Z-axis;
determining a level cone;
determining whether the Y component of the accelerometer vector is within the level cone;
in response to determining that the Y component of the accelerometer vector is within the level cone, determining that the head of the wearer is level; and
in response to determining that the Y component of the accelerometer vector is not within the level cone, determining that the head of the wearer is not level.

4. The method of claim 1, wherein determining whether the head of the wearer is tilted up based on the lookup-indication data comprises:
determining a second accelerometer vector based on the lookup-indication data, the second accelerometer vector comprising an X component along the X-axis, a Y component along the Y-axis, and a Z component along the Z-axis;
determining a roll cone about the X-axis;
determining whether the X component of the second accelerometer vector is outside of the roll cone; and in response to determining that the X component of the second accelerometer vector is outside of the roll cone, determining that the head of the wearer is not tilted up.

5. The method of claim 4, wherein determining whether the head of the wearer is tilted up based on the lookup-indication data further comprises:
in response to determining that the X component of the second accelerometer vector is inside of the roll cone:
determining a lookup-gesture-trigger cone about the Y-axis;
determining whether the Y component of the second accelerometer vector is outside of the lookup-gesture-trigger cone;
in response to determining that the Y component of the second accelerometer vector is not outside of the lookup-gesture-trigger cone, determining that the head of the wearer is not tilted up; and
in response to determining that the Y component of the second accelerometer vector is outside of the lookup-gesture-trigger cone:
determining whether the Z component of the second accelerometer vector corresponds to an upwards tilt,
in response to determining that the Z component of the second accelerometer vector does not correspond to the upwards tilt, determining that the head of the wearer is not tilted up, and
in response to determining that the Z component of the second accelerometer vector does correspond to the upwards tilt, determining that the head of the wearer is tilted up.

6. The method of claim 1, wherein the lookup-indication data comprises accelerometer data from the accelerometer and gyroscope data from a gyroscope, and wherein determining whether the head of the wearer is tilted up based on the lookup-indication data comprises:
determining an accelerometer vector based on the accelerometer data;
determining whether the head of the wearer has apparently tilted up based on the accelerometer vector;
determining whether the head of the wearer has rotated based on the rotation data;
in response to either determining that the head of the wearer has not apparently tilted up based on the accelerometer vector or determining that the head of the wearer has not rotated based on the rotation data, determining that the head of the wearer is not tilted up; and
in response to determining that the head of the wearer has apparently tilted up based on the accelerometer vector and determining that the head of the wearer has rotated based on the rotation data, determining that the head of the wearer is tilted up.

7. The method of claim 1, wherein the lookup-indication data comprises first accelerometer data from the accelerometer and second accelerometer data from a second accelerometer, wherein the second accelerometer is located closer to a pivot point of the head of the wearer than the first accelerometer, and wherein determining whether the head of the wearer is tilted up based on the lookup-indication data comprises:
defining an X-axis, a Y-axis, and a Z-axis for the WCD;
determining a first accelerometer vector based on the first accelerometer data, the first accelerometer vector comprising a first Y-component along the Y-axis;
determining a second accelerometer vector based on the second accelerometer data, the second accelerometer vector comprising a second Y-component along the Y-axis;
determining an absolute value of an accelerometer vector difference (AVD) between the first and second accelerometer vectors,
determining whether the absolute value of the AVD exceeds an AVD threshold;
determining a Y-component difference between the first Y-component and the second Y-component;
in response to either determining that the Y-component difference is not positive or determining that the absolute value of the AVD does not exceed the AVD threshold, determining that the head of the wearer is not tilted up; and
in response to determining that the Y-component difference is positive and determining that the absolute value of the AVD does exceed the AVD threshold, determining that the head of the wearer is tilted up.

8. The method of claim 1, further comprising:
in response to the gesture-recognition trigger, generating a gesture-recognition interrupt.

9. The method of claim 1, wherein the lookup-indication data comprises accelerometer data from the accelerometer and magnetic-field data from a magnetometer, and wherein determining whether the head of the wearer is tilted up based on the lookup-indication data comprises:
determining an accelerometer vector based on the accelerometer data;
determining whether the head of the wearer has apparently tilted up based on the accelerometer vector;
verifying whether the head of the wearer has tilted up based on the magnetic-field data;
in response to either determining that the head of the wearer has not apparently tilted up based on the accelerometer vector or not verifying that the head of the wearer has tilted up based on the magnetic-field data, determining that the head of the wearer is not tilted up; and
in response to determining that the head of the wearer has apparently tilted up based on the accelerometer vector and verifying that the head of the wearer has tilted up based on the magnetic-field data, determining that the head of the wearer is tilted up.

10. A wearable computing device (WCD), comprising:
an accelerometer;
a processor; and
a computer-readable storage medium having stored thereon program instructions that, upon execution by the processor, cause the WCD to perform operations comprising:
receiving level-indication data from the accelerometer,
determining whether a head of a wearer of the WCD is level relative to gravity based on the level-indication data, wherein determining whether the head of the wearer is level comprises comparing a magnitude of the level-indication data to a minimum magnitude threshold and a maximum magnitude threshold, and
in response to determining that the head of the wearer is level,
receiving lookup-indication data from the accelerometer,
determining whether the head of the wearer is tilted up relative to gravity based on the lookup-indication data, and
in response to determining that the head of the wearer is tilted up,
generating a gesture-recognition trigger, wherein the gesture-recognition trigger indicates that the head of the wearer has moved up from level.

11. The WCD of claim 10, wherein determining whether the head of the wearer is level comprises:
- determining whether the magnitude of the level-indication data is greater than the maximum magnitude threshold;
- in response to determining that the magnitude of the level-indication data is greater than the maximum magnitude threshold, determining that the head of the wearer is not level; and
- in response to determining that the magnitude of the level-indication data is less than the minimum magnitude threshold, determining that the head of the wearer is not level.

12. The WCD of claim 10, wherein determining whether the head of the wearer is level comprises:
- defining an X-axis, a Y-axis, and a Z-axis for the accelerometer;
- determining an accelerometer vector based on the level-indication data, the accelerometer vector comprising an X component along the X-axis, a Y component along the Y-axis, and a Z component along the Z-axis;
- determining a level cone;
- determining whether the Y component of the accelerometer vector is within the level cone;
- in response to determining that the Y component of the accelerometer vector is within the level cone, determining that the head of the wearer is level; and
- in response to determining that the Y component of the accelerometer vector is not within the level cone, determining that the head of the wearer is not level.

13. The WCD of claim 10, wherein determining whether the head of the wearer is tilted up based on the lookup-indication data comprises:
- determining a second accelerometer vector based on the lookup-indication data, the second accelerometer vector comprising an X component along the X-axis, a Y component along the Y-axis, and a Z component along the Z-axis;
- determining a roll cone about the X-axis;
- determining whether the X component of the second accelerometer vector is outside of the roll cone; and
- in response to determining that the X component of the second accelerometer vector is outside of the roll cone, determining that the head of the wearer is not tilted up.

14. The WCD of claim 13, wherein determining whether the head of the wearer is tilted up based on the lookup-indication data further comprises:
- in response to determining that the X component of the second accelerometer vector is inside of the roll cone:
  - determining a lookup-gesture-trigger cone about the Y-axis;
  - determining whether the Y component of the second accelerometer vector is outside of the lookup-gesture-trigger cone;
  - in response to determining that the Y component of the second accelerometer vector is not outside of the lookup-gesture-trigger cone, determining that the head of the wearer is not tilted up; and
  - in response to determining that the Y component of the second accelerometer vector is outside of the lookup-gesture-trigger cone:
    - determining whether the Z component of the second accelerometer vector corresponds to an upwards tilt;
    - in response to determining that the Z component of the second accelerometer vector does not correspond to the upwards tilt, determining that the head of the wearer is not tilted up; and
    - in response to determining that the Z component of the second accelerometer vector does correspond to the upwards tilt, determining that the head of the wearer is tilted up.

15. The WCD of claim 10, further comprising a gyroscope, wherein the lookup-indication data comprises accelerometer data from the accelerometer and gyroscope data from the gyroscope, and wherein determining whether the head of the wearer is tilted up based on the lookup-indication data comprises:
- determining an accelerometer vector based on the accelerometer data;
- determining whether the head of the wearer has apparently tilted up based on the accelerometer vector;
- determining whether the head of the wearer has rotated based on the rotation data;
- in response to either determining that the head of the wearer has not apparently tilted up based on the accelerometer vector or determining that the head of the wearer has not rotated based on the rotation data, determining that the head of the wearer is not tilted up; and
- in response to determining that the head of the wearer has apparently tilted up based on the accelerometer vector and determining that the head of the wearer has rotated based on the rotation data, determining that the head of the wearer is tilted up.

16. The WCD of claim 10, further comprising a second accelerometer, wherein the lookup-indication data comprises first accelerometer data from the accelerometer and second accelerometer data from the second accelerometer, wherein the second accelerometer is located closer to a pivot point of the head of the wearer than the first accelerometer, and wherein determining whether the head of the wearer is tilted up based on the lookup-indication data comprises:
- defining an X-axis, a Y-axis, and a Z-axis for the WCD;
- determining a first accelerometer vector based on the first accelerometer data, the first accelerometer vector comprising a first Y-component along the Y-axis;
- determining a second accelerometer vector based on the second accelerometer data, the second accelerometer vector comprising a second Y-component along the Y-axis;
- determining an absolute value of an accelerometer vector difference (AVD) between the first and second accelerometer vectors;
- determining whether the absolute value of the AVD exceeds an AVD threshold;
- determining a Y-component difference between the first Y-component and the second Y-component;
- in response to either determining that the Y-component difference is not positive or determining that the absolute value of the AVD does not exceed the AVD threshold, determining that the head of the wearer is not tilted up; and
- in response to determining that the Y-component difference is positive and determining that the absolute value of the AVD does exceed the AVD threshold, determining that the head of the wearer is tilted up.

17. The WCD of claim 10, further comprising a magnetometer, wherein the lookup-indication data comprises accelerometer data from the accelerometer and magnetic-field data from the magnetometer, and wherein determining whether the head of the wearer is tilted up based on the lookup-indication data comprises:
- determining an accelerometer vector based on the accelerometer data;

determining whether the head of the wearer has apparently tilted up based on the accelerometer vector;
verifying whether the head of the wearer has tilted up based on the magnetic-field data;
in response to either determining that the head of the wearer has not apparently tilted up based on the accelerometer vector or not verifying that the head of the wearer has tilted up based on the magnetic-field data, determining that the head of the wearer is not tilted up; and
in response to determining that the head of the wearer has apparently tilted up based on the accelerometer vector and verifying that the head of the wearer has tilted up based on the magnetic-field data, determining that the head of the wearer is tilted up.

18. The WCD of claim 10, wherein the operations further comprise:
in response to the gesture-recognition trigger, generating a gesture-recognition interrupt.

19. An apparatus, including a non-transitory computer-readable storage medium having stored thereon program instructions that, upon execution by a computing device, cause the apparatus to perform operations comprising: receiving level-indication data from an accelerometer; determining whether a head of a wearer of the apparatus is level relative to gravity based on the level-indication data, wherein determining whether the head of the wearer is level comprises comparing a magnitude of the level-indication data to a minimum magnitude threshold and a maximum magnitude threshold; and in response to determining that the head of the wearer is level, receiving lookup-indication data from the accelerometer, determining whether the head of the wearer is tilted up relative to gravity based on the lookup-indication data, and in response to determining that the head of the wearer is tilted up, generating a gesture-recognition trigger, wherein the gesture-recognition trigger indicates that the head of the wearer has moved up from level.

20. The apparatus of claim 19, wherein determining whether the head of the wearer is level comprises:
determining whether the magnitude of the level-indication data is greater than the maximum magnitude threshold;
in response to determining that the magnitude of the level-indication data is greater than the maximum magnitude threshold, determining that the head of the wearer is not level; and
in response to determining that the magnitude of the level-indication data is less than the minimum magnitude threshold, determining that the head of the wearer is not level.

21. The apparatus of claim 19, wherein determining whether the head of the wearer is level comprises:
defining an X-axis, a Y-axis, and a Z-axis for the accelerometer;
determining an accelerometer vector based on the level-indication data, the accelerometer vector comprising an X component along the X-axis, a Y component along the Y-axis, and a Z component along the Z-axis;
determining a level cone;
determining whether the Y component of the vector is within the level cone;
in response to determining that the Y component of the accelerometer vector is within the level cone, determining that the head of the wearer is level; and
in response to determining that the Y component of the accelerometer vector is not within the level cone, determining that the head of the wearer is not level.

22. The apparatus of claim 19, wherein determining whether the head of the wearer is tilted up based on the lookup-indication data comprises:
determining a second accelerometer vector based on the lookup-indication data, the second accelerometer vector comprising an X component along the X-axis, a Y component along the Y-axis, and a Z component along the Z-axis;
determining a roll cone about the X-axis;
determining whether the X component of the second accelerometer vector is outside of the roll cone; and
in response to determining that the X component of the second accelerometer vector is outside of the roll cone, determining that the head of the wearer is not tilted up.

23. The apparatus of claim 22, wherein determining whether the head of the wearer is tilted up based on the lookup-indication data further comprises:
in response to determining that the X component of the second accelerometer vector is inside of the roll cone:
determining a lookup-gesture-trigger cone about the Y-axis;
determining whether the Y component of the second accelerometer vector is outside of the lookup-gesture-trigger cone;
in response to determining that the Y component of the second accelerometer vector is not outside of the lookup-gesture-trigger cone, determining that the head of the wearer is not tilted up; and
in response to determining that the Y component of the second accelerometer vector is outside of the lookup-gesture-trigger cone:
determining whether the Z component of the second accelerometer vector corresponds to an upwards tilt;
in response to determining that the Z component of the second accelerometer vector does not correspond to the upwards tilt, determining that the head of the wearer is not tilted up; and
in response to determining that the Z component of the second accelerometer vector does correspond to the upwards tilt, determining that the head of the wearer is tilted up.

24. The apparatus of claim 19, wherein the lookup-indication data comprises accelerometer data from the accelerometer and gyroscope data from a gyroscope, and wherein determining whether the head of the wearer is tilted up based on the lookup-indication data comprises:
determining an accelerometer vector based on the accelerometer data;
determining whether the head of the wearer has apparently tilted up based on the accelerometer vector;
determining whether the head of the wearer has rotated based on the rotation data;
in response to either determining that the head of the wearer has not apparently tilted up based on the accelerometer vector or determining that the head of the wearer has not rotated based on the rotation data, determining that the head of the wearer is not tilted up; and
in response to determining that the head of the wearer has apparently tilted up based on the accelerometer vector and determining that the head of the wearer has rotated based on the rotation data, determining that the head of the wearer is tilted up.

25. The apparatus of claim 19, wherein the lookup-indication data comprises first accelerometer data from the accelerometer and second accelerometer data from a second accelerometer, wherein the second accelerometer is located closer to a pivot point of the head of the wearer than the accelerometer, and wherein determining whether the head of the wearer is tilted up based on the lookup-indication data comprises:

defining an X-axis, a Y-axis, and a Z-axis for the WCD;

determining a first accelerometer vector based on the first accelerometer data, the first accelerometer vector comprising a first Y-component along the Y-axis;

determining a second accelerometer vector based on the second accelerometer data, the second accelerometer vector comprising a second Y-component along the Y-axis;

determining an absolute value of an accelerometer vector difference (AVD) between the first and second accelerometer vectors, determining whether the absolute value of the AVD exceeds an AVD threshold;

determining a Y-component difference between the first Y-component and the second Y-component;

in response to either determining that the Y-component difference is not positive or determining that the absolute value of the AVD does not exceed the AVD threshold, determining that the head of the wearer is not tilted up; and in response to determining that the Y-component difference is positive and determining that the absolute value of the AVD does exceed the AVD threshold, determining that the head of the wearer is tilted up.

26. The apparatus of claim 19, wherein the lookup-indication data comprises accelerometer data from the accelerometer and magnetic-field data from a magnetometer, and wherein determining whether the head of the wearer is tilted up based on the lookup-indication data comprises:

determining an accelerometer vector based on the accelerometer data;

determining whether the head of the wearer has apparently tilted up based on the accelerometer vector;

verifying whether the head of the wearer has tilted up based on the magnetic-field data;

in response to either determining that the head of the wearer has not apparently tilted up based on the accelerometer vector or not verifying that the head of the wearer has tilted up based on the magnetic-field data, determining that the head of the wearer is not tilted up; and in response to determining that the head of the wearer has apparently tilted up based on the accelerometer vector and verifying that the head of the wearer has tilted up based on the magnetic-field data, determining that the head of the wearer is tilted up.

27. The apparatus of claim 19, wherein the operations further comprise:

in response to the gesture-recognition trigger, generating a gesture-recognition interrupt.

* * * * *